US011815598B2

(12) United States Patent
Pratt et al.

(10) Patent No.: US 11,815,598 B2
(45) Date of Patent: Nov. 14, 2023

(54) ANTI-COLLISION AND MOTION MONITORING, CONTROL, AND ALERTING SYSTEMS AND METHODS

(71) Applicant: MICROSOFT TECHNOLOGY LICENSING, LLC, Redmond, WA (US)

(72) Inventors: Andrew James Pratt, Houston, TX (US); Monil Dinesh Morar, Houston, TX (US); Mark Alan Foresman, Houston, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 16/896,964

(22) Filed: Jun. 9, 2020

(65) Prior Publication Data

US 2020/0386887 A1 Dec. 10, 2020

Related U.S. Application Data

(60) Provisional application No. 62/994,522, filed on Mar. 25, 2020, provisional application No. 62/859,533, filed on Jun. 10, 2019.

(51) Int. Cl.
*G01S 17/06* (2006.01)
*G01S 17/93* (2020.01)
(Continued)

(52) U.S. Cl.
CPC .............. *G01S 17/06* (2013.01); *G01S 17/93* (2013.01); *G02B 27/0172* (2013.01);
(Continued)

(58) Field of Classification Search
CPC .......... G01S 17/06; G01S 17/93; G01S 17/88; G01S 17/89; G01S 17/86; G02B 27/0172;
(Continued)

(56) References Cited

U.S. PATENT DOCUMENTS 6,820,702 B2 11/2004 Niedermayr et al.
6,892,812 B2 5/2005 Niedermayr et al.
(Continued)

FOREIGN PATENT DOCUMENTS

CN 107610269 A 1/2018
EP 2380709 A2 10/2011
(Continued)

OTHER PUBLICATIONS

International Search Report and Written Opinion from PCT Application No. PCT/US2020/037015, dated Sep. 17, 2020, 16 pgs.
(Continued)

*Primary Examiner* — Jitesh Patel
(74) *Attorney, Agent, or Firm* — Novo TechIP International PLLC

(57) ABSTRACT

Systems and methods presented herein include an anti-collision and motion monitoring system includes light detection and ranging (LiDAR) systems configured to detect locations of objects in an environment. The anti-collision and motion monitoring system also includes camera systems configured to capture images of the objects in the environment that are detected by the LiDAR systems. The anti-collision and motion monitoring system further includes processing circuitry configured to coordinate operation of the LiDAR systems and the camera systems, to receive inputs from the LiDAR systems and the camera systems relating to the objects in the environment, to process the inputs received from the LiDAR systems and the camera systems to determine outputs relating to monitoring, control, and alerting relating to the objects in the environment, and to communicate the outputs to a central coordinator.

19 Claims, 11 Drawing Sheets

(51) Int. Cl.
*G06V 20/10* (2022.01)
*G02B 27/01* (2006.01)
*G08B 21/18* (2006.01)

(52) U.S. Cl.
CPC ............ *G06V 20/10* (2022.01); *G08B 21/182* (2013.01); *G02B 2027/0178* (2013.01)

(58) Field of Classification Search
CPC .......... G02B 2027/0178; G06V 20/10; G06V 20/58; G08B 21/182; G08B 13/1965; G08B 13/19695; G08B 21/02
See application file for complete search history.

(56) References Cited

U.S. PATENT DOCUMENTS

| | | | |
|---|---|---|---|
| 7,412,861 B2 | 8/2008 | Lohmann | |
| 8,063,780 B2 | 11/2011 | Onishi | |
| 8,115,650 B2 | 2/2012 | Dasilva et al. | |
| 9,143,843 B2 | 9/2015 | De Luca et al. | |
| 9,396,398 B2 | 7/2016 | Kozicz et al. | |
| 9,596,451 B2 | 3/2017 | Walter et al. | |
| 9,639,725 B1 | 5/2017 | Maricic et al. | |
| 9,694,879 B2 | 7/2017 | Maidla et al. | |
| 9,703,290 B1 | 7/2017 | Vandapel et al. | |
| 9,706,185 B2 | 7/2017 | Ellis | |
| 9,762,864 B2 | 9/2017 | Norland et al. | |
| 9,782,668 B1* | 10/2017 | Golden | A63F 13/00 |
| 9,896,170 B1 | 2/2018 | Assal | |
| 10,099,372 B2 | 10/2018 | Vu et al. | |
| 10,107,679 B2 | 10/2018 | Haberer et al. | |
| 10,118,548 B1 | 11/2018 | Fields et al. | |
| 10,228,232 B2 | 3/2019 | Friend et al. | |
| 10,402,662 B2 | 9/2019 | Kozicz et al. | |
| 10,445,944 B2 | 10/2019 | Galera et al. | |
| 10,452,939 B2 | 10/2019 | Tani et al. | |
| 11,093,759 B2* | 8/2021 | Doria | G06K 9/6276 |
| 11,258,987 B2 | 2/2022 | Pratt et al. | |
| 2009/0021582 A1* | 1/2009 | Nakaya | H04N 7/18 348/148 |
| 2012/0081544 A1 | 4/2012 | Wee | |
| 2013/0201052 A1 | 8/2013 | Saint Clair et al. | |
| 2014/0210609 A1* | 7/2014 | Yang | B60Q 1/2676 340/463 |
| 2015/0228066 A1* | 8/2015 | Farb | G06V 20/58 348/148 |
| 2015/0269427 A1 | 9/2015 | Kim et al. | |
| 2017/0094530 A1 | 3/2017 | Ross | |
| 2017/0154223 A1 | 6/2017 | Maali et al. | |
| 2017/0197313 A1 | 7/2017 | Nishino | |
| 2017/0255193 A1 | 9/2017 | Berg et al. | |
| 2017/0270579 A1 | 9/2017 | Ridao Carlini et al. | |
| 2017/0291542 A1* | 10/2017 | Dakroub | G08G 1/205 |
| 2018/0096277 A1 | 4/2018 | Maidla et al. | |
| 2018/0172828 A1 | 6/2018 | Moody et al. | |
| 2018/0222051 A1 | 8/2018 | Vu et al. | |
| 2018/0222052 A1 | 8/2018 | Vu et al. | |
| 2018/0232593 A1 | 8/2018 | Tani et al. | |
| 2018/0250520 A1* | 9/2018 | Hyde | A61N 2/006 |
| 2018/0251199 A1 | 9/2018 | Radford et al. | |
| 2018/0347752 A1 | 12/2018 | Costello et al. | |
| 2018/0356821 A1* | 12/2018 | Kentley-Klay | G01C 21/3415 |
| 2018/0364693 A1 | 12/2018 | Harshbarger | |
| 2019/0061158 A1 | 2/2019 | Vu et al. | |
| 2019/0122517 A1* | 4/2019 | Kimura | G08B 19/00 |
| 2019/0174149 A1 | 6/2019 | Zhang et al. | |
| 2019/0213525 A1 | 7/2019 | Haci et al. | |
| 2019/0228647 A1* | 7/2019 | Conde | G05D 1/0088 |
| 2019/0244521 A1* | 8/2019 | Ran | G08G 1/22 |
| 2019/0291723 A1 | 9/2019 | Srivatsa et al. | |
| 2019/0340909 A1 | 11/2019 | Nguyen et al. | |
| 2019/0385463 A1 | 12/2019 | Cantrell et al. | |
| 2020/0309942 A1* | 10/2020 | Kunz | G01S 13/931 |

FOREIGN PATENT DOCUMENTS

| | | |
|---|---|---|
| NL | 2020067 B1 | 6/2019 |
| NL | 2020707 B1 | 10/2019 |
| WO | 2016178069 A1 | 11/2016 |
| WO | 2017093197 A1 | 6/2017 |
| WO | 2018164581 A1 | 9/2018 |
| WO | 2019025221 A1 | 2/2019 |
| WO | 2019058379 A1 | 3/2019 |
| WO | 2019081135 A1 | 5/2019 |
| WO | 2019151876 A1 | 8/2019 |
| WO | 2019163211 A1 | 8/2019 |
| WO | 2019163212 A1 | 8/2019 |
| WO | 2019174691 A1 | 9/2019 |
| WO | 2019231798 A1 | 12/2019 |

OTHER PUBLICATIONS

International Search Report and Written Opinion from PCT Application No. PCT/US2019/051336, dated Dec. 11, 2019, 13 pgs.
"Final Office Action Issued in U.S. Appl. No. 16/570,689", dated Aug. 26, 2020, 10 Pages.
"Final Office Action Issued in U.S. Appl. No. 16/570,689", dated Jul. 29, 2021, 6 Pages.
"Non Final Office Action Issued in U.S. Appl. No. 16/570,689", dated Apr. 28, 2020, 10 Pages.
"Non Final Office Action Issued in U.S. Appl. No. 16/570,689", dated Mar. 11, 2021, 10 Pages.
"Office Action Issued in Indian Patent Application No. 202117016797", dated Nov. 14, 2022, 8 Pages.
"Office Action Issued in European Patent Application No. 19779314.4", dated May 8, 2023, 6 Pages.

* cited by examiner

ANTI-COLLISION AND MOTION MONITORING, CONTROL, AND ALERTING SYSTEMS AND METHODS

CROSS-REFERENCES TO RELATED APPLICATIONS

This application claims priority to and the benefit of U.S. Provisional Application No. 62/859,533, entitled "Anti-Collision and Motion Control Systems and Methods," filed Jun. 10, 2019, and claims priority to and the benefit of U.S. Provisional Application No. 62/994,522, entitled "Anti-Collision and Motion Monitoring, Control, and Alerting Systems and Methods," filed Mar. 25, 2020, both of which are hereby incorporated by reference in their entireties for all purposes.

FIELD OF DISCLOSURE

The present disclosure relates generally to anti-collision and motion control alerting systems and methods. More specifically, embodiments of the present disclosure relate to systems and methods for anti-collision and motion control using light detection and ranging (LiDAR) and high-fidelity camera techniques to provide alerts relating to activity in a physical environment.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, an anti-collision and motion control system includes a plurality of anti-collision and motion monitoring systems. Each anti-collision and motion monitoring system includes one or more light detection and ranging (LiDAR) systems configured to detect locations of one or more objects in an environment, one or more camera systems configured to capture images of the one or more objects in the environment that are detected by the one or more LiDAR systems, and processing circuitry configured to receive inputs from the one or more LiDAR systems and the one or more camera systems relating to the one or more objects in the environment, and to process the inputs received from the one or more LiDAR systems and the one or more camera systems to determine outputs relating to the one or more objects in the environment. The anti-collision and motion control system also includes a central coordinator configured to receive the outputs from the processing circuitry of the plurality of anti-collision and motion monitoring systems, to compile the outputs into visualization data relative to a plurality of grid sections of a rectilinear grid of the environment, and to communicate a visualization of the rectilinear grid of the environment to a user interface. The visualization includes the visualization data relative to the plurality of grid sections of the rectilinear grid of the environment. In addition, the visualization data defines positioning and movement of the one or more objects relative to the plurality of grid sections of the rectilinear grid of the environment.

In addition, in certain embodiments, an anti-collision and motion monitoring system includes one or more light detection and ranging (LiDAR) systems configured to detect locations of one or more objects in an environment and one or more camera systems configured to capture images of the one or more objects in the environment that are detected by the one or more LiDAR systems. The anti-collision and motion monitoring system also includes processing circuitry configured to receive inputs from the one or more LiDAR systems and the one or more camera systems relating to the one or more objects in the environment, to process the inputs received from the one or more LiDAR systems and the one or more camera systems to determine primary data relating to the one or more objects in the environment relative to a first plurality of grid sections of a rectilinear grid of the environment, and to request complementary data relating to the one or more objects in the environment relative to a second plurality of grid sections of the rectilinear grid from a second anti-collision and motion monitoring system only when the processing circuitry cannot determine primary data relating to the one or more objects in the environment relative to the second plurality of grid sections of the rectilinear grid.

In addition, in certain embodiments, an anti-collision and motion control system, includes one or more anti-collision and motion monitoring systems. Each anti-collision and motion monitoring system includes one or more light detection and ranging (LiDAR) systems configured to detect locations of one or more objects in an environment, one or more camera systems configured to capture images of the one or more objects in the environment that are detected by the one or more LiDAR systems, and processing circuitry configured to receive inputs from the one or more LiDAR systems and the one or more camera systems relating to the one or more objects in the environment, and to process the inputs received from the one or more LiDAR systems and the one or more camera systems to determine outputs relating to the one or more objects in the environment. The anti-collision and motion control system also includes a central coordinator configured to receive the outputs from the processing circuitry of the one or more anti-collision and motion monitoring systems, to determine one or more alarms relating to activity of the one or more objects in the environment based at least in part on the outputs received from the processing circuitry of the one or more anti-collision and motion monitoring systems, and to communicate the one or more alarms to one or more wearable devices located in the environment.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
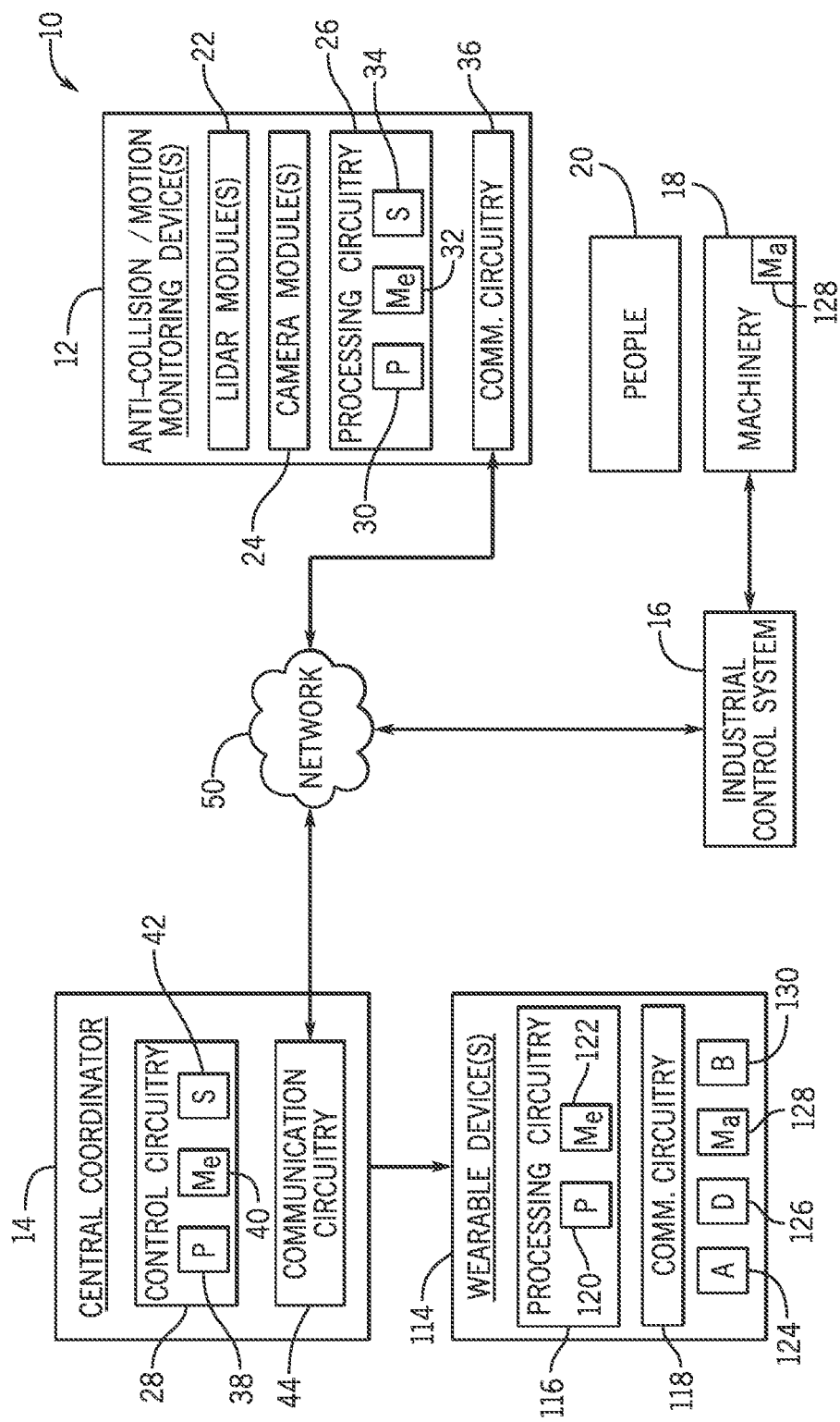
FIG. 1 is a schematic diagram of an anti-collision and motion control system using light detection and ranging (LiDAR) and high-fidelity camera techniques, in accordance with embodiments the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

The anti-collision and motion control system described herein includes fully packaged anti-collision and motion monitoring devices that utilize software algorithms to monitor critical areas within physical environments, and accurately identify and protecting a plurality of different types of objects (e.g., machinery and/or people), whether autonomous or non-autonomous, located within designated areas within the physical environments. In doing so, the anti-collision and motion control system described herein is capable of, for example, triggering alarms, alerting operators, and setting areas within the physical environment to controlled states through communication within equipment located within the physical environment. Using a three-dimensional mapping of the physical environment, the anti-collision and motion monitoring devices are capable of accurately identifying particular objects (e.g., humans, vehicles, pieces of equipment, and so forth), providing a two-step recognition process using light detection and ranging (LiDAR) modules and high-fidelity camera modules, and making decisions according to the particular object's proximity to an area of particular interest within the physical environment. For example, if a determination is made that a human is too close to the area of particular interest, the anti-collision and motion control system may control operating parameters of certain pieces of equipment in the area of particular interest (e.g., without human intervention, in certain embodiments). The anti-collision and motion control system described herein is also capable of detecting operational activities taking place based on multi-object tracking using a mesh network to interface between multiple anti-collision and motion monitoring devices, and accurately delivering movement information, which will enhance the transparency of the operation and its current activity.

As such, the anti-collision and motion control system described herein provides a safe and intelligent tracking solution to manage assets in real-time and provide telemetry readings to trend datasets, thereby making facilities safer and environments more manageable. In particular, the anti-collision and motion control system described herein includes a combination of LiDAR technology, advanced high-fidelity vision processing, and integrated high-powered edge computing to accurately identify and predict movements of people and machinery within customizable dedicated zones. Utilizing point cloud light data to detect objects (e.g., machinery and people) combined with machine learning algorithms to classify humans vs machines, for example, the embodiments described herein keep personnel and machinery safe while also increasing operational efficiencies.

In addition, the embodiments described herein facilitate the addition of a multitude of anti-collision and motion monitoring devices in a mesh network, wirelessly, in a plug-and-play manner, but also minimize the data transferred between the anti-collision and motion monitoring devices. In other words, instead of having all of the anti-collision and motion monitoring devices transmitting data between all of the other anti-collision and motion monitoring devices in the mesh network, the embodiments described herein intelligently determine what data needs to be transmitted to which other anti-collision and motion monitoring devices in the mesh network for the purpose of enabling the anti-collision and motion control system described herein to provide more robust control of the operations taking place within the physical environment. In addition, because the data processing and transmission requirements of the anti-collision and motion monitoring devices described herein are minimized, the only cables that are required are data cables and, indeed, in certain scenarios, even the data cables may be omitted, with batteries being used in the anti-collision and motion monitoring devices instead.

FIG. 1 is a schematic diagram of an anti-collision and motion control system 10 using light detection and ranging (LiDAR) and high-fidelity camera techniques, in accordance with embodiments the present disclosure. In particular, as illustrated in FIG. 1, in certain embodiments, the anti-collision and motion control system 10 may include one or more anti-collision and motion monitoring devices 12 and a central coordinator 14 configured to coordinate operation of the one or more anti-collision and motion monitoring devices 12 and one or more industrial control systems 16 that are used to control operating parameters of machinery 18 disposed in a physical environment being monitored by the one or more anti-collision and motion monitoring devices 12 (e.g., without human intervention, in certain embodiments). In addition, in certain embodiments, the central coordinator 14 may be configured to alert people 20 located in the physical environment being monitored by the one or more anti-collision and motion monitoring devices 12, for example, when the people 20 move into areas of the physical environment that the central coordinator 14 believes that the people 20 should not be.

As illustrated in FIG. 1, each anti-collision and motion monitoring device 12 includes one or more light detection and ranging (LiDAR) modules 22, each configured to detect locations of one or more objects (e.g., machinery 18 and/or people 20) located in the physical environment. As also illustrated in FIG. 1, each anti-collision and motion monitoring device 12 includes one or more camera modules 24 configured to capture images of the one or more objects (e.g., machinery 18 and/or people 20) located in the physical environment. In addition, as also illustrated in FIG. 1, each anti-collision and motion monitoring device 12 includes processing circuitry 26 configured to coordinate operation of the one or more LiDAR modules 22 and the one or more camera modules 24 by, for example, receiving inputs from the one or more LiDAR modules 22 and the one or more camera modules 24 relating to the one or more objects (e.g., machinery 18 and/or people 20) located in the physical environment, processing the inputs received from the one or more LiDAR modules 22 and the one or more camera modules 24 to determine outputs relating to control of at least one of the one or more objects (e.g., machinery 18) located in the physical environment, and to communicate the outputs to a central coordinator 14, which includes control circuitry 28 configured to control one or more operating parameters of at least one of the one or more objects (e.g., machinery 18) located in the physical environment based at least in part on the inputs received from the one or more LiDAR modules 22 and the one or more camera modules 24.

Although described primarily herein as utilizing anti-collision and motion monitoring devices 12 that each include one or more LiDAR modules 22 and one or more camera modules 24, in other embodiments, certain features described herein may be accomplished with different combinations of types of cameras or light detection devices. For example, in certain embodiments, the anti-collision and motion monitoring devices 12 may include only one or more LiDAR modules 22 or only one or more camera modules 24 (e.g., either two-dimensional or three-dimensional). In addition, in certain embodiments the anti-collision and motion monitoring devices 12 may include thermal cameras.

As will be appreciated, in certain embodiments, the processing circuitry 26 of the anti-collision and motion monitoring devices 12 may include at least one processor 30, at least one memory medium 32, at least one storage medium 34, or any of a variety of other components that enable the processing circuitry 26 to carry out the techniques described herein. In addition, in certain embodiments, each anti-collision and motion monitoring device 12 may include communication circuitry 36 to facilitate the anti-collision and motion monitoring devices 12 to communicate with each other, as well as with the central coordinator 14, for example. In certain embodiments, the communication circuitry 36 may be configured to facilitate wireless communication and/or wired communication.

The at least one processor 30 of the anti-collision and motion monitoring devices 12 may be any suitable type of computer processor or microprocessor capable of executing computer-executable code. In certain embodiments, the at least one processor 30 of the anti-collision and motion monitoring devices 12 may also include multiple processors that may perform the operations described herein. The at least one memory medium 32 and the at least one storage medium 34 of the anti-collision and motion monitoring devices 12 may be any suitable articles of manufacture that can serve as media to store processor-executable code, data, or the like. These articles of manufacture may represent computer-readable media (e.g., any suitable form of memory or storage) that may store the processor-executable code used by the at least one processor 30 to perform the presently disclosed techniques. As described in greater detail herein, the at least one memory medium 32 and the at least one storage medium 34 of the anti-collision and motion monitoring devices 12 may also be used to store data, various other software applications, and the like. The at least one memory medium 32 and the at least one storage medium 34 of the anti-collision and motion monitoring devices 12 may represent non-transitory computer-readable media (e.g., any suitable form of memory or storage) that may store the processor-executable code used by the at least one processor 30 to perform various techniques described herein. It should be noted that non-transitory merely indicates that the media is tangible and not a signal.

Similarly, in certain embodiments, the control circuitry 28 of the central coordinator 14 may include at least one processor 38, at least one memory medium 40, at least one storage medium 42, or any of a variety of other components that enable the control circuitry 28 to carry out the techniques described herein. In addition, in certain embodiments, the central coordinator 14 may include communication circuitry 44 to facilitate the central coordinator 14 to communicate with the anti-collision and motion monitoring devices 12, for example. In certain embodiments, the communication circuitry 44 may be configured to facilitate wireless communication and/or wired communication.

The at least one processor 38 of the central coordinator 14 may be any suitable type of computer processor or microprocessor capable of executing computer-executable code. In certain embodiments, the at least one processor 38 of the central coordinator 14 may also include multiple processors that may perform the operations described herein. The at least one memory medium 40 and the at least one storage medium 42 of the central coordinator 14 may be any suitable articles of manufacture that can serve as media to store processor-executable code, data, or the like. These articles of manufacture may represent computer-readable media (e.g., any suitable form of memory or storage) that may store the processor-executable code used by the at least one processor 38 to perform the presently disclosed techniques. As described in greater detail herein, the at least one memory medium 40 and the at least one storage medium 42 of the central coordinator 14 may also be used to store data, various other software applications, and the like. The at least one memory medium 40 and the at least one storage medium 42 of the central coordinator 14 may represent non-transitory computer-readable media (e.g., any suitable form of memory or storage) that may store the processor-executable code used by the at least one processor 38 to perform various techniques described herein. It should be noted that non-transitory merely indicates that the media is tangible and not a signal.

Figure 2:
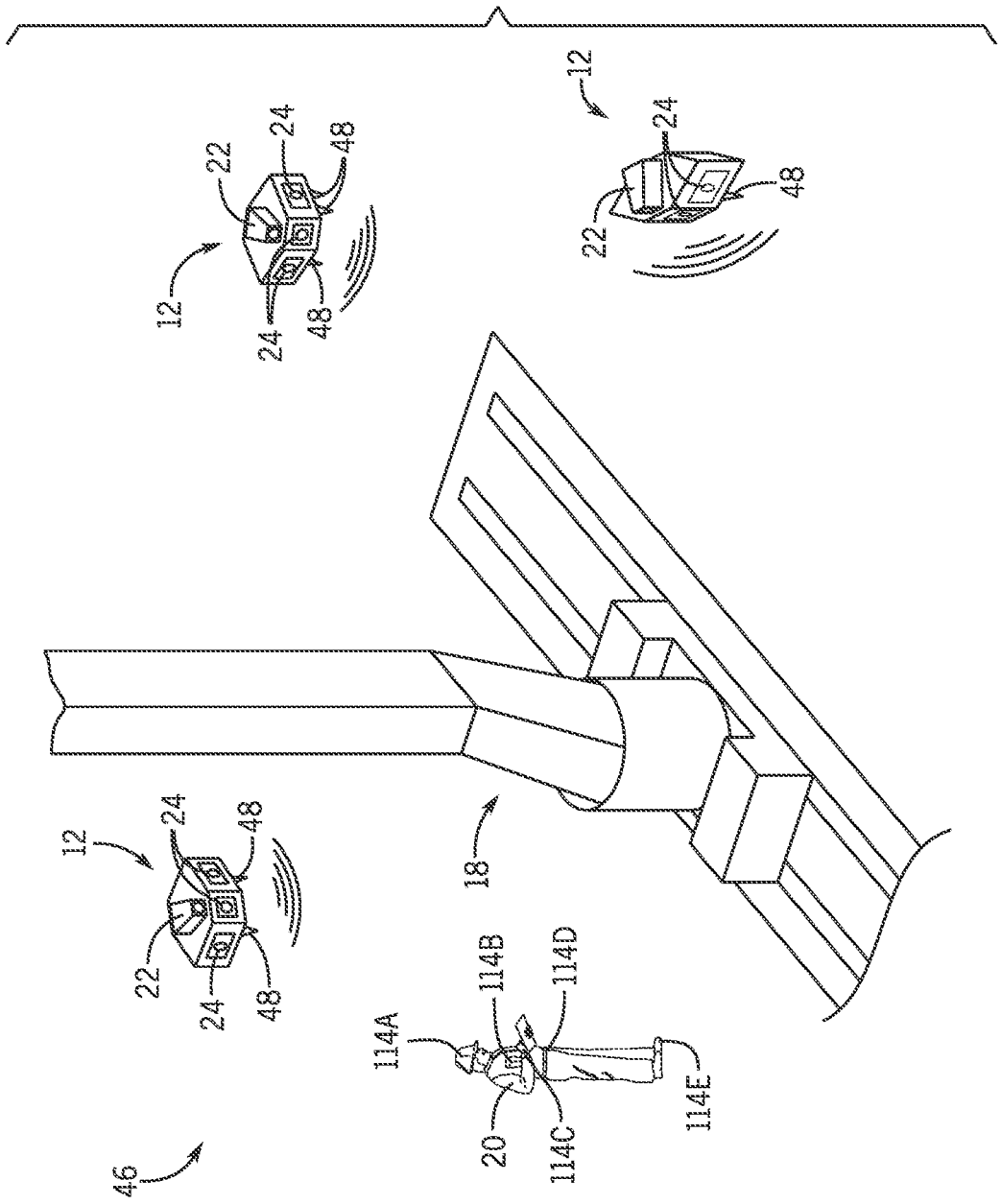
FIG. 2 is a perspective view of a physical environment that may be monitored by the anti-collision and motion control system of FIG. 1, in accordance with embodiments the present disclosure.

To better illustrate the functionality of the anti-collision and motion control system 10 of FIG. 1, FIG. 2 is a perspective view of a physical environment 46 (e.g., a drill rig, a plant floor, and so forth) that may be monitored by the anti-collision and motion control system 10, in accordance with embodiments the present disclosure. As illustrated in FIG. 2, one or more pieces of machinery 18 may be disposed in the physical environment 46, and various people 20 may wander through the physical environment 46, for example, to perform work duties, observe operations within the physical environment 46, and so forth. Although illustrated in FIG. 2 as having four anti-collision and motion monitoring devices 12 monitoring the physical environment 46, in other embodiments, any number of anti-collision and motion monitoring devices 12 may be used to monitor the physical environment 46.

The one or more LiDAR modules 22 of the anti-collision and motion monitoring devices 12 are configured to detect locations of one or more objects (e.g., machinery 18 and/or people 20) located in the physical environment 46. For example, the one or more LiDAR modules 22 of the anti-collision and motion monitoring devices 12 are configured to emit pulses of laser light into the physical environment 46, to detect pulses that are reflected off of the objects (e.g., machinery 18 and/or people 20) located in the physical environment 46, and to determine locations of the objects (e.g., machinery 18 and/or people 20) located in the physical environment 46 based on the reflected pulses. More specifically, the one or more LiDAR modules 22 of the anti-collision and motion monitoring devices 12 are configured to consider return time of the reflected pulses, differences in wavelengths of the reflected pulses, and so forth, to determine a three-dimensional mapping of the physical environment 46, which may be processed by the processing circuitry 26 of the respective anti-collision and motion monitoring device 12 to detect locations of specific objects (e.g., machinery 18 and/or people 20) located in the physical environment 46 and, indeed, to classify the detected objects (e.g., machinery 18 and/or people 20) located in the physical environment 46 based at least in part on the detection performed by the LiDAR modules 22. For example, the processing circuitry 26 may identify the objects (e.g., machinery 18 and/or people 20) located in the physical environment 46 as particular types of machinery 18, specific people 20, and so forth, based at least in part on the detection performed by the LiDAR modules 22.

In addition, the one or more camera modules 24 of the anti-collision and motion monitoring devices 12 are configured to capture images of the one or more objects (e.g., machinery 18 and/or people 20) located in the physical environment 46, which may also be processed by the processing circuitry 26 of the respective anti-collision and motion monitoring device 12 to classify the detected objects (e.g., machinery 18 and/or people 20) located in the physical environment 46 based at least in part on the images captured by the camera modules 24. For example, the processing circuitry 26 may identify the objects (e.g., machinery 18 and/or people 20) located in the physical environment 46 as particular types of machinery 18, specific people 20, and so forth, based at least in part on the images captured by the camera modules 24.

Figure 3:
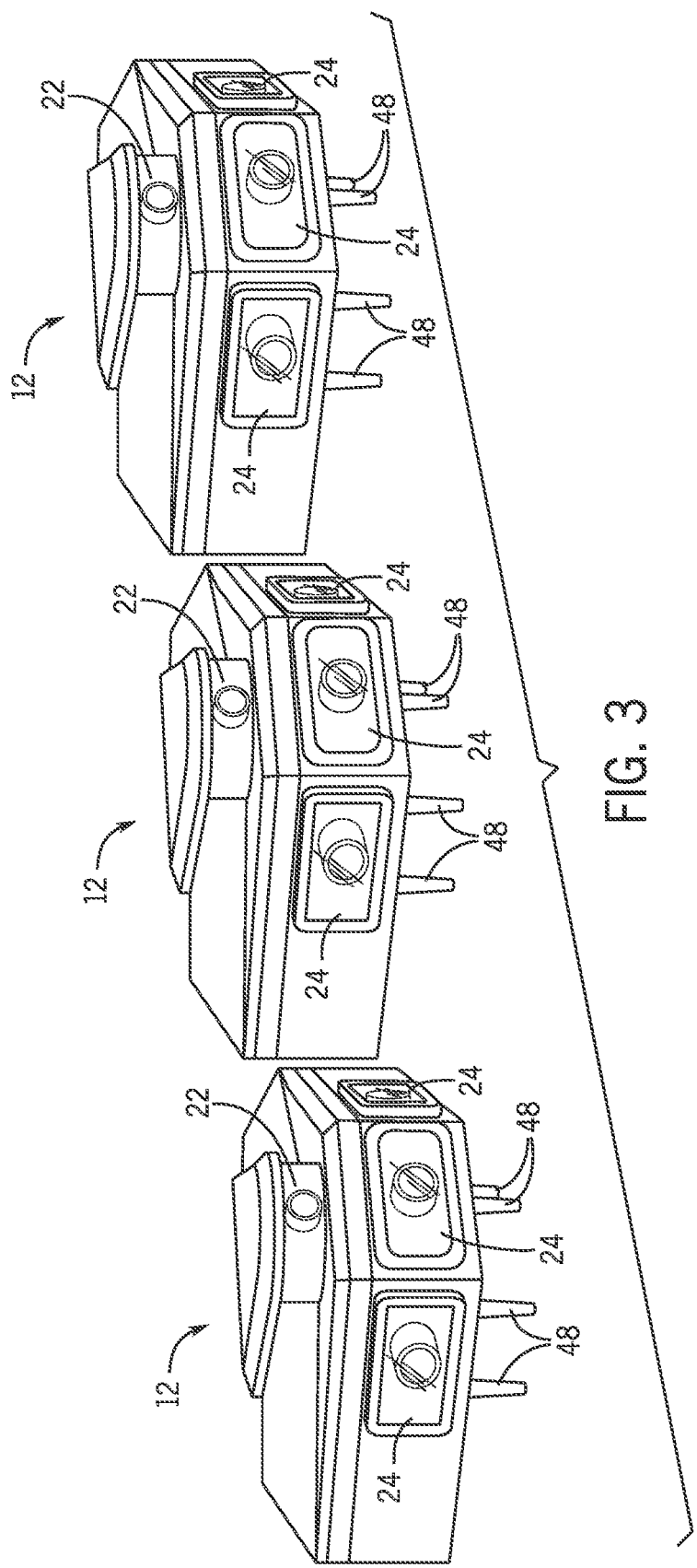
FIG. 3 are perspective views of a plurality of anti-collision and motion monitoring devices of the anti-collision and motion control system of FIG. 1, in accordance with embodiments the present disclosure.

FIG. 3 are perspective views of a plurality of anti-collision and motion monitoring devices 12 of the anti-collision and motion control system 10 of FIG. 1, in accordance with embodiments the present disclosure. As illustrated in FIG. 3, in certain embodiments, the one or more LiDAR modules 22, the one or more camera modules 24, and the processing circuitry 26 of each anti-collision and motion monitoring device 12 may be integrated together within a common housing of the anti-collision and motion monitoring device 12. As such, the anti-collision and motion monitoring devices 12 described herein are fully self-contained packages capable of being deployed in various types of physical environments 46, and coordinated via a central coordinator 14, as illustrated in FIG. 1. In addition, as illustrated in FIG. 3, in certain embodiments, the anti-collision and motion monitoring devices 12 may include a plurality of antennae 48, which may be part of the communication circuitry 36 of the anti-collision and motion monitoring devices 12, as well as serving a secondary function as legs for the anti-collision and motion monitoring devices 12.

Returning now to FIG. 1, the central coordinator 14 of the anti-collision and motion control system 10 may establish a communication network 50 between the various anti-collision and motion monitoring devices 12 monitoring a particular physical environment 46. In other words, the communication circuitry 44 of the central coordinator 14 and the communication circuitry 36 of the various anti-collision and motion monitoring devices 12 monitoring a particular physical environment 46 may each communicate with each other in a non-hierarchical manner (e.g., as a mesh network) in real-time such that each of the components has access to the same data as the others. In certain embodiments, the communication network 50 may be a wireless communication network (e.g., using Wi-Fi, Bluetooth, or other wireless communication techniques) to facilitate rapid and more flexible deployment of the anti-collision and motion monitoring devices 12 in particular physical environments 46.

In certain embodiments, the communication network 50 may include various subnetworks including, but not limited to, a local mesh network and a demilitarized zone (DMZ) network, both of which may communicate with each other via other communication techniques including, but not limited to, one or more firewalls, the Internet, satellite networks, and so forth. In general, the local mesh network may include one or more anti-collision and motion monitoring devices 12, which are deployed in one or more physical environments 46 being monitored by the central coordinator 14, which may be part of the DMZ network, which also may include one or more storage media, such as a central archive storage server. In addition, in certain embodiments, software applications running on computing devices in the DMZ network may, for example, provide visualization functionality related to the monitoring and control provided by the anti-collision and motion control system 10.

In certain embodiments, the central coordinator 14 may include devices and/or software that provide an edge gateway for the one or more anti-collision and motion monitoring devices 12, such that the processing circuitry 26 of the one or more anti-collision and motion monitoring devices 12 may preprocess the data that is collected (e.g., by the respective one or more LiDAR modules 22 and the respective one or more camera modules 24) before providing it to the central coordinator 14. For example, once the processing circuitry 26 of the one or more anti-collision and motion monitoring devices 12 preprocess the data collected by the respective one or more LiDAR modules 22 and the respective one or more camera modules 24, the one or more anti-collision and motion monitoring devices 12 may communicate with the central coordinator 14 via the mesh network, which may in certain embodiments include one or more wireless application protocol (WAP) devices, one or more sensor relays, one or more layer switches, and so forth, which may facilitate communication between the one or more anti-collision and motion monitoring devices 12 and the central coordinator 14 via the mesh network.

It should be noted that, in certain embodiments, the LiDAR modules 22, the camera modules 24, the processing circuitry 26, and/or the communication circuitry 36 of the anti-collision and motion monitoring devices 12 may actually include multiple instances of each, such that the LiDAR modules 22, the camera modules 24, the processing circuitry 26, and/or the communication circuitry 36 are redundant for the anti-collision and motion monitoring devices 12, thereby enhancing the robustness of the anti-collision and motion monitoring devices 12. For example, in certain embodiments, the anti-collision and motion monitoring devices 12 may include two, three, or even more, of the LiDAR modules 22 and of the camera modules 24. In addition, in certain embodiments, the anti-collision and motion monitoring devices 12 may include two or more instances of the processing circuitry 26, In addition, in certain embodiments, the anti-collision and motion monitoring devices 12 may include two or more instances of the communication circuitry 36 as redundant for the purposes of communicating the telemetry data of the objects (e.g., machinery 18 and/or people 20) located in the physical environment 46 via a mesh network, as described herein, as well as two or more instances of the communication circuitry 36 as redundant for the purposes of communicating archive data, backup data, updates, and so forth, between the anti-collision and motion monitoring devices 12 in the mesh network.

Figure 4:
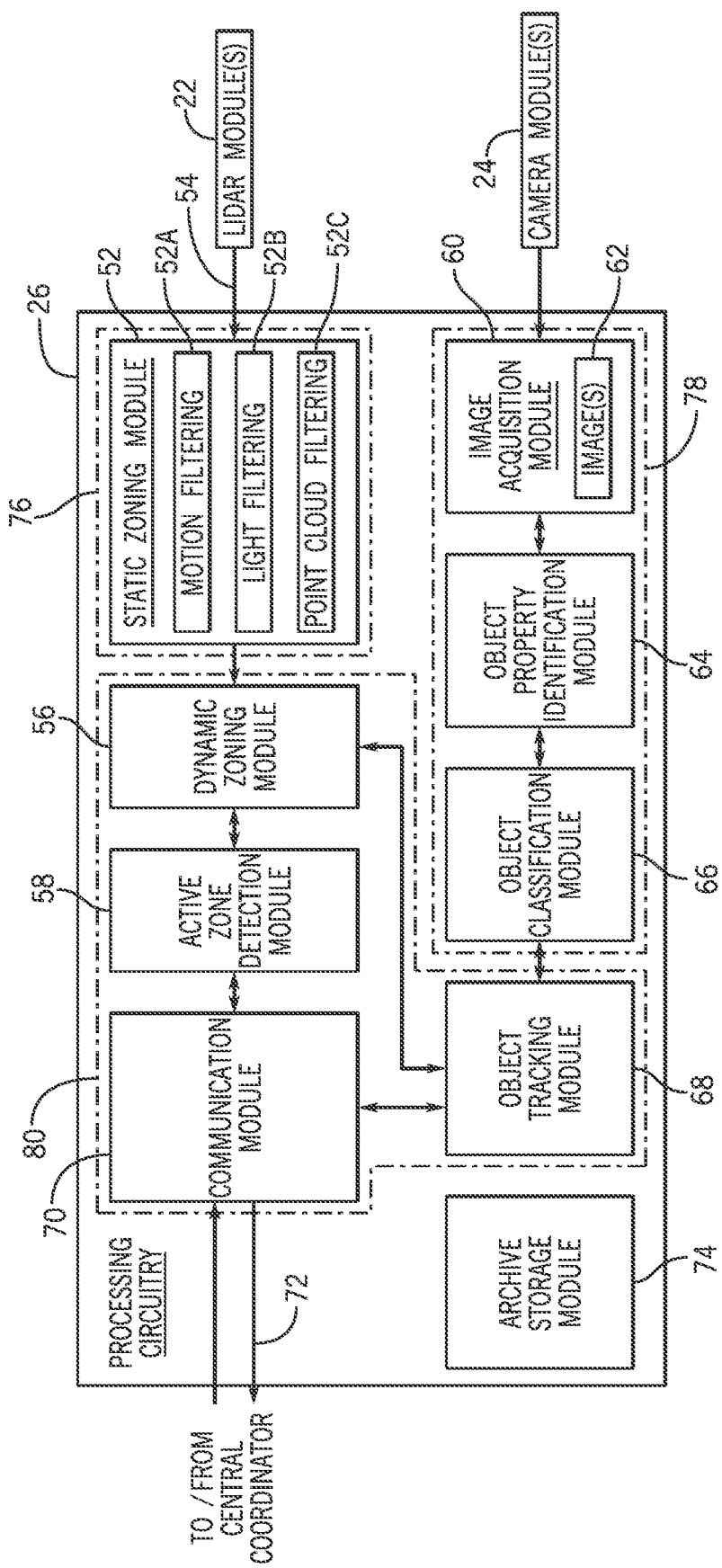
FIG. 4 is a schematic diagram of processing circuitry of the anti-collision and motion monitoring devices, in accordance with embodiments the present disclosure.

FIG. 4 is a schematic diagram of the processing circuitry 26 of the anti-collision and motion monitoring devices 12, in accordance with embodiments the present disclosure. In particular, FIG. 4 illustrates various modules (e.g., hardware modules, software modules, hardware/software modules, and so forth) that are configured, for example, to coordinate operation of the LiDAR modules 22 and the camera modules 24 of the respective anti-collision and motion monitoring device 12, to receive inputs from the LiDAR modules 22 and the camera modules 24 of the respective anti-collision and motion monitoring device 12 relating to objects (e.g., machinery 18 and/or people 20) located in the physical environment 46, to process the inputs received from the LiDAR modules 22 and the camera modules 24 of the respective anti-collision and motion monitoring device 12 to determine outputs relating to control of at least one of the objects (e.g., machinery 18 and/or people 20) located in the physical environment 46, to communicate the outputs to the central coordinator 14 to control one or more operating parameters of at least one of the objects (e.g., machinery 18) located in the physical environment 46 based at least in part on the inputs received from the LiDAR modules 22 and the camera modules 24 of the respective anti-collision and motion monitoring device 12, and so forth.

As illustrated in FIG. 4, in certain embodiments, the processing circuitry 26 may include a static zoning module 52 configured to receive inputs 54 from the LiDAR modules 22 of the respective anti-collision and motion monitoring device 12, and to perform static zoning of locations of objects (e.g., machinery 18 and/or people 20) located in the physical environment 46, which are detected by the LiDAR modules 22. For example, in certain embodiments, the static zoning module 52 may include one or more sub-modules that are configured to perform motion filtering 52A, light filtering 52B, point cloud filtering 52C, and various combinations thereof. In addition, in certain embodiments, the processing circuitry 26 may also include a dynamic zoning module 56 configured to perform dynamic zoning of the locations of the objects (e.g., machinery 18 and/or people 20) located in the physical environment 46, which are detected by the LiDAR modules 22, based on the static zoning performed by the static zoning module 52. In general, the static zoning module 52 and the dynamic zoning module 56 of the processing circuitry 26 are configured to function together to monitor the physical environment 46 for the purpose of aiding in the tracking of the objects (e.g., machinery 18 and/or people 20) located in the physical environment 46. In certain embodiments, the static zoning module 52 may capture snapshots of the physical environment 46 periodically, and may use a point of reference to calibrate the real-time filtering of static objects within the physical environment 46. For example, some identified objects in the physical environment 46 (e.g., windows, wall structures such as beams, and so forth) may be known to never move, and these objects may be used to calibrate the real-time filtering of static objects within the physical environment 46. As such, the amount of computing and the speed of computing may be reduced.

As illustrated in FIG. 4, in certain embodiments, the processing circuitry 26 may also include an active zone detection module 58 configured to determine which zones of a plurality of zones of the physical environment are active (e.g., which currently have, or recently have, had movement of objects occur within them), and the dynamic zoning module 56 may perform the dynamic zoning of the locations of the objects (e.g., machinery 18 and/or people 20) located in the physical environment 46 based at least in part on the active zones in the physical environment 46, which are determined by the active zone detection module 58. For example, in certain embodiments, the active zone detection module 58 may determine the active zones in the physical environment 46 based on the object tracking performed by the processing circuitry 26, as described herein, and/or based on communications with the central coordinator 14. In other words, in certain embodiments, the active zones in the physical environment 46 may be based on detection of recent motion within the physical environment 46, may be predetermined by the central coordinator 14, may be predetermined by the central coordinator 14 but modified upon detection of recent motion within the physical environment 46, and so forth. The ability to only perform dynamic zoning of active zones, as determined by the active zone detection module 58, may reduce the processing cycles required by the dynamic zoning module 56, as well as reduce the amount of data that will be communicated to the central coordinator 14.

In addition, in certain embodiments, the processing circuitry 26 may include an image acquisition module 60 configured to acquire images 62 of the objects (e.g., machinery 18 and/or people 20) located in the physical environment 46, which are captured by the camera modules 24 of the respective anti-collision and motion monitoring device 12. In addition, in certain embodiments, the processing circuitry 26 may also include an object property identification module 64 configured to identify properties (e.g., identification of object types, such as types of machinery, whether the object is a person, whether the object is stationary or in motion, and so forth) of at least one of the objects (e.g., machinery 18 and/or people 20) located in the physical environment 46 based at least in part on the images 62 acquired by the image acquisition module 60. In addition, in certain embodiments, the processing circuitry 26 may also include an object classification module 66 configured to classify at least one of the objects (e.g., machinery 18 and/or people 20) located in the physical environment 46 based at least in part on the images 62 acquired by image acquisition module 60. In addition, in certain embodiments, the processing circuitry 26 may also include an object tracking module 68 configured to track location, orientation, or motion of at least one of the objects (e.g., machinery 18 and/or people 20) located in the physical environment 46 based at least in part on the images 62 acquired by image acquisition module 60. In addition, in certain embodiments, the object tracking module 68 may be configured to track location, orientation, or motion of at least one of the objects (e.g., machinery 18 and/or people 20) located in the physical environment 46 based at least in part on input from the dynamic zoning module 56 of the processing circuitry 26.

In addition, in certain embodiments, the processing circuitry 26 may include a communication module 70 configured to communicate (e.g., wirelessly via the communication circuitry 36, in certain embodiments; however, wired communication may also be used) outputs 72 from the processing circuitry 26 to the central coordinator 14 and, in certain embodiments, to processing circuitry 26 of other anti-collision and motion monitoring devices 12. For example, in certain embodiments, the outputs 72 may be communicated between the various anti-collision and motion monitoring devices 12 (e.g., via a mesh network) to reduce network latency, for example. In such embodiments, one of the anti-collision and motion monitoring devices 12 may function as a master for all of the other anti-collision and motion monitoring devices 12 such that the master anti-collision and motion monitoring device 12 coordinates the communication of outputs 72 from the various other anti-collision and motion monitoring devices 12 to the central coordinator 14. Furthermore, in certain embodiments, the anti-collision and motion monitoring devices 12 may only make requests of data from other anti-collision and motion monitoring devices 12 when that particular data is needed for the processing of the particular anti-collision and motion monitoring device 12, in order to minimize the amount of data being transferred via the mesh network. For example, in certain embodiments, if one anti-collision and motion monitoring device 12 is tracking a particular object, but loses a line of sight (e.g., an unobstructed view of the particular object by the LiDAR modules 22 or the camera modules 24 of the anti-collision and motion monitoring device 12 is at least partially lost) of the object, that particular anti-collision and motion monitoring device 12 may send a request to another anti-collision and motion monitoring device 12 to provide data relating to the object for which the line of sight has been lost. As such, the anti-collision and motion monitoring devices 12 may function together in a coordinated manner of "swarm processing" whereby data from the various anti-collision and motion monitoring devices 12 may be stitched together to give the central coordinator 14 a collective view of objects (e.g., machinery 18 and/or people 20) monitored by the various anti-collision and motion monitoring devices 12.

In certain embodiments, at least some of the outputs 72 communicated to the central coordinator 14 from an anti-collision and motion monitoring device 12 may relate to the location, orientation, or motion of at least one of the objects (e.g., machinery 18 and/or people 20) located in the physical environment 46 (i.e., telemetry data of the objects), which is tracked by the object tracking module 68 of the anti-collision and motion monitoring device 12. Furthermore, in certain embodiments, the communication module 70 may be configured to receive information from the central coordinator 14, such as which zones of the physical environment 46 are active (e.g., for input into the active zone detection module 58 of the processing circuitry 26). In addition, in certain embodiments, the processing circuitry 26 may include an archive storage module 74 configured to store data from any of the various modules of the processing circuitry 26 (e.g., data relating to the inputs 54 from the LiDAR modules 22, data relating to the images 62 captured by the camera modules 24 and acquired by the image acquisition module 60, data relating to outputs 72 communicated to the central coordinator 14, or any other data processed by the various modules of the processing circuitry 26).

In general, the various modules of the processing circuitry 26 of the anti-collision and motion monitoring devices 12 may be considered as distinct processing groups of modules that cooperate with each other for the purpose of tracking objects (e.g., machinery 18 and/or people 20) located in the physical environment 46. For example, the static zoning module 52 may be considered as part of a LiDAR processing group 76 of modules, the image acquisition module 60, the object property identification module 64, and the object classification module 66 may be considered as part of an image processing group 78 of modules, and the dynamic zoning module 56, the active zone detection module 58, the object tracking module 68, and the communication module 70 may be considered as part of a core processing group 80 of modules.

In addition, in certain embodiments, the processing circuitry 26 of the anti-collision and motion monitoring devices 12 may include other, or different, modules not shown in FIG. 4. For example, in certain embodiments, the LiDAR processing group 76 of modules may include an object property identification module 64 and an object classification module 66 (e.g., between the static zoning module 52 and the dynamic zoning module 56) instead of, or in addition to, the object property identification module 64 and the object classification module 66 of the image processing group 78 of modules, which may perform object property identification and object classification, respectively, based on the inputs 54 from the LiDAR modules 22, instead of based on the images 62 acquired by the image acquisition module 60. In such embodiments, the object property identification module 64 and the object classification module 66 of the LiDAR processing group 76 of modules may be used to check the results of the object property identification module 64 and the object classification module 66 of the image processing group 78 of modules and/or to calibrate the processing of the object property identification module 64 and the object classification module 66 of the image processing group 78 of modules.

In addition, in certain embodiments, in the interest of reducing the processing required of the various modules of the processing circuitry 26 of the anti-collision and motion monitoring devices 12, as well as reduce the amount of data being transferred via the mesh network, in certain embodiments, certain of the modules of the processing circuitry 26 may not continually perform their processing, but may rather only perform their particular processing tasks when requested by one of the other modules of the processing circuitry 26. As but one non-limiting example, in certain embodiments, once an object has been classified by the object classification module 66, the object classification module 66 may not be requested to classify any other objects until additional motion (e.g., not relating to any presently classified objects) is detected by the static and dynamic zoning modules 52, 56 and/or when the object tracking module 68 requests that an object be re-identified (e.g., in a situation where the object disappears from a line of sight of the particular anti-collision and motion monitoring device 12 temporarily).

Figure 5:
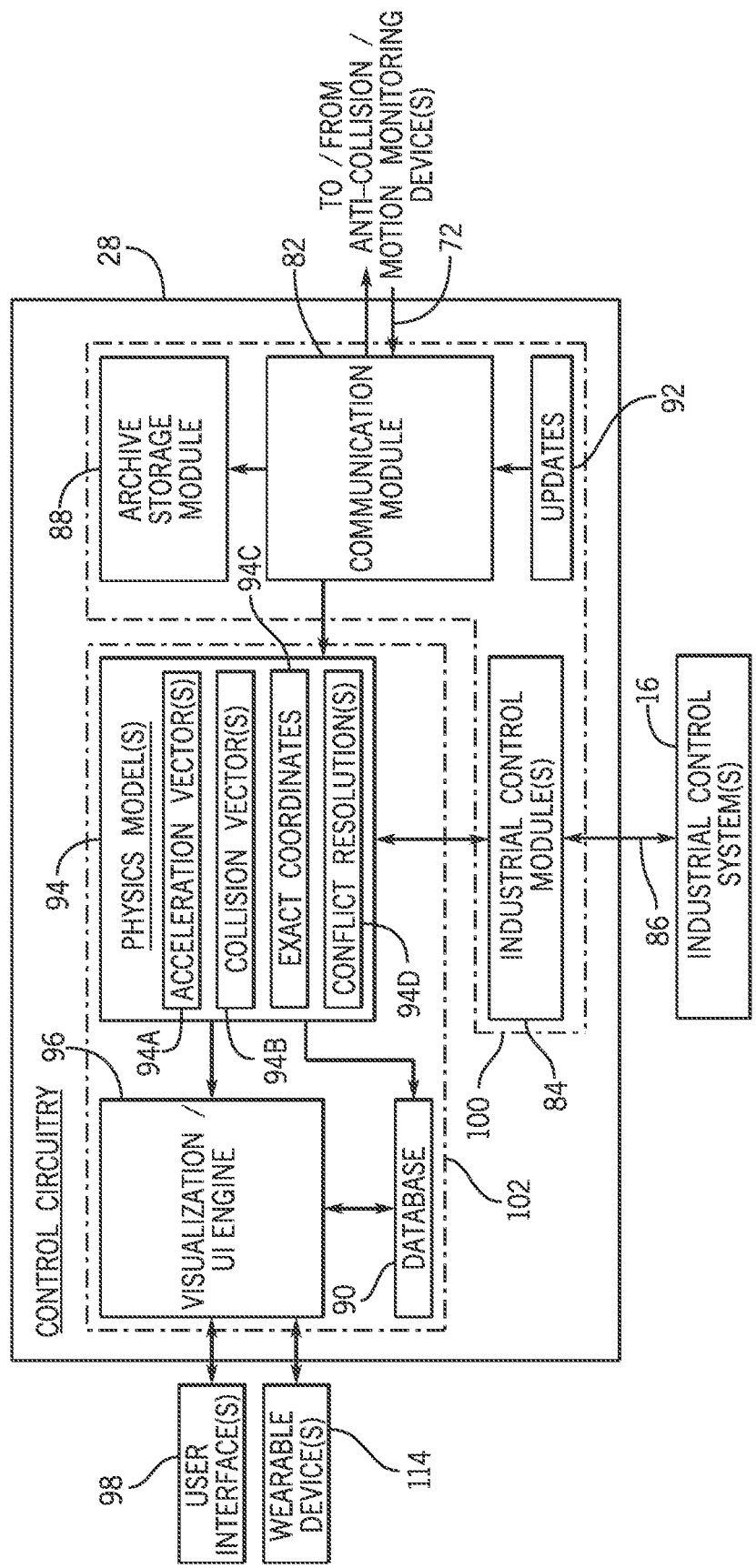
FIG. 5 is a schematic diagram of control circuitry of the central coordinator, in accordance with embodiments the present disclosure.

FIG. 5 is a schematic diagram of the control circuitry 28 of the central coordinator 14, in accordance with embodiments the present disclosure. In particular, FIG. 5 illustrates various modules (e.g., hardware modules, software modules, hardware/software modules, and so forth) that are configured, for example, to receive the outputs 72 from the processing circuitry 26 of the one or more anti-collision and motion monitoring devices 12, and to control one or more operating parameters of at least one of the objects (e.g., machinery 18) located in the physical environment 46 based at least in part on the outputs 72 received from the processing circuitry 26 of the one or more anti-collision and motion monitoring devices 12.

For example, as illustrated in FIG. 5, in certain embodiments, the control circuitry 28 may include a communication module 82 configured to receive (e.g., wirelessly via the communication circuitry 44, in certain embodiments; however, wired communication may also be used) the outputs 72 from the processing circuitry 26 of the one or more anti-collision and motion monitoring devices 12. Indeed, the communication module 82 of the control circuitry 28 may be configured to bi-directionally communicate with the communication modules 70 of the one or more anti-collision and motion monitoring devices 12 to transfer data between the central coordinator 14 and the one or more anti-collision and motion monitoring devices 12, as described in greater detail herein.

In addition, in certain embodiments, the control circuitry 28 may include one or more industrial control module(s) 84 configured to communicate control signals 86 (e.g., stop commands, and so forth) to one or more industrial control systems 16 to control one or more operating parameters of at least one of the objects (e.g., machinery 18) located in the physical environment 46 based at least in part on the outputs 72 received from the one or more anti-collision and motion monitoring devices 12 and/or based at least in part on information from one or more physics models, as described in greater detail herein. In addition, in certain embodiments, the industrial control module(s) 84 may be configured to perform control system validation. For example, in certain embodiments, the industrial control module(s) 84 may receive feedback signals from the industrial control systems 16 during operation of the industrial control systems 16, which may be used to validate the control signals 86 that are being communicated to the industrial control systems 16 are effecting the one or more operating parameters of the objects (e.g., machinery 18) located in the physical environment 46 that are being controlled. In addition, in certain embodiments, positioning encoders in the industrial control systems 16 may provide information relating to locations of the industrial control systems 16 within the physical environment 46, and the industrial control module(s) 84 may be configured to validate this location information based on object tracking performed by the control circuitry 28.

In addition, in certain embodiments, the control circuitry 28 may also include an archive storage module 88 configured to store data from any of the various modules of the control circuitry 28 (e.g., data relating to the outputs 72 received from the one or more anti-collision and motion monitoring devices 12, data relating to the control signals 86 communicated to the ICSs, or any other data processed by the various modules of the control circuitry 28). For example, in certain embodiments, as the outputs 72 from the one or more anti-collision and motion monitoring devices 12 (e.g., the telemetry data relating to one or more tracked objects) are received by the communication module 82, raw data relating to the outputs 72 may be stored in the archive storage module 88, and the raw data may be processed by the control circuitry 28, as described in greater detail herein, and the processed data may be stored in a separate database 90. In certain embodiments, the raw data may also be synched to cloud storage, for example. In addition, in certain embodiments, the control circuitry 28 may be configured to communicate software updates 92 to the processing circuitry 26 of the one or more anti-collision and motion monitoring devices 12.

In addition, in certain embodiments, the control circuitry 28 may be configured to control one or more operating parameters of at least one of the objects (e.g., machinery 18) located in the physical environment 46 based at least in part on one or more physics models 94, for example, stored in memory of the control circuitry 28. For example, in certain embodiments, the control circuitry 28 may be configured to control one or more operating parameters of at least one of the objects (e.g., machinery 18) located in the physical environment 46 based at least in part on one or more acceleration vectors 94A relating to at least one of the objects (e.g., machinery 18 and/or people 20) located in the physical environment 46. In addition, in certain embodiments, the control circuitry 28 may be configured to control one or more operating parameters of at least one of the objects (e.g., machinery 18) located in the physical environment 46 based at least in part on one or more collision vectors 94B relating to at least one of the objects (e.g., machinery 18 and/or people 20) located in the physical environment 46. In addition, in certain embodiments, the control circuitry 28 may be configured to control one or more operating parameters of at least one of the objects (e.g., machinery 18) located in the physical environment 46 based at least in part on one or more exact coordinates 94C of at least one of the objects (e.g., machinery 18 and/or people 20) located in the physical environment 46. In addition, in certain embodiments, the control circuitry 28 may be configured to control one or more operating parameters of at least one of the objects (e.g., machinery 18) located in the physical environment 46 based at least in part on one or more conflict resolutions 94D relating to at least one of the objects (e.g., machinery 18 and/or people 20) located in the physical environment 46.

In certain embodiments, the one or more physics models 94 may enable the control circuitry 28 to predict a future location, orientation, or motion of at least one of the objects (e.g., machinery 18 and/or people 20) located in the physical environment 46 based at least in part on previous location, orientation, or motion of the at least one of the objects (e.g., machinery 18 and/or people 20) located in the physical environment 46. For example, in certain embodiments, the one or more physics models 94 may include data relating to movement trajectories that are commonly tracked for a particular object (e.g., machinery 18 and/or people 20) that has been identified by the object property identification module 64 of the processing circuitry 26 of the one or more anti-collision and motion monitoring devices 12, for example, and the control circuitry 28 may use the data relating to the movement trajectories to predict a future location, orientation, or motion of the particular object. For example, a certain identified person 20 may have common movement patterns while in the physical environment 46 (e.g., while inspecting the machinery 18). Similarly, a certain piece of machinery 18 may have common movement patterns during operation. These types of common movement patterns may be used by the control circuitry 28 to predict future location, orientation, or motion of the particular object, which may be used to control one or more operating parameters of at least one of the objects (e.g., machinery 18) located in the physical environment 46, as described in greater detail herein.

In addition, in certain embodiments, the control circuitry 28 may include a visualization/UI engine 96 configured to provide one or more visualizations of the physical environment 46 to a user interface 98 communicatively coupled to the central coordinator 14. In particular, the visualization/UI engine 96 may provide an application program interface (API) that the user interface 98 may access in order to provide the one or more visualizations of the physical environment 46 based at least in part on the processed data stored in the database 90, for example.

Similar to the processing circuitry 26 of the anti-collision and motion monitoring devices 12, the various modules of the control circuitry 28 of the central coordinator 14 may be considered as distinct processing groups of modules that cooperate with each other for the purpose of controlling objects (e.g., machinery) located in the physical environment 46. For example, the communication module 82, the archive storage module 88, and the industrial control module(s) 84 may be considered as part of a data processing control group 100 of modules, and the database 90, the physics models 94, and the visualization/UI engine 96 may be considered as part of a UI group 102 of modules.

As described in greater detail herein, the anti-collision and motion monitoring devices 12 may be specifically configured to cooperate with each other to automatically form a mesh network of connectivity when the anti-collision and motion monitoring devices 12 are operating in close proximity with each other. For example, in certain embodiments, when more than one anti-collision and motion monitoring devices 12 are deployed within a particular physical environment 46 and within a particular range (e.g., within 100 feet, within 200 feet, within 300 feet, within 500 feet, and so forth), the anti-collision and motion monitoring devices 12 may automatically establish communications with each other (e.g., via the communication circuitry 36 of the anti-collision and motion monitoring devices 12) to communicatively couple the anti-collision and motion monitoring devices 12 together with each other in a mesh network, such that the anti-collision and motion monitoring devices 12 may coordinate with each other to monitor machinery 18 and/or people 20 within the physical environment 46. In particular, if neither of the anti-collision and motion monitoring devices 12 communicating with each other had previously been communicatively coupled into a mesh network (e.g., with other anti-collision and motion monitoring devices 12), a new mesh network may be created by the anti-collision and motion monitoring devices 12. However, if one of the anti-collision and motion monitoring devices 12 communicating with each other had previously been communicatively coupled into a mesh network, the other anti-collision and motion monitoring device 12 may then join the previously-established mesh network. In certain embodiments, the anti-collision and motion monitoring devices 12 joining the mesh network may be required to provide authenticating information (e.g., which may be stored in the at least one memory medium 32 and/or the at least one storage medium 34 of the respective anti-collision and motion monitoring device 12) to the other anti-collision and motion monitoring device 12.

Figure 6:
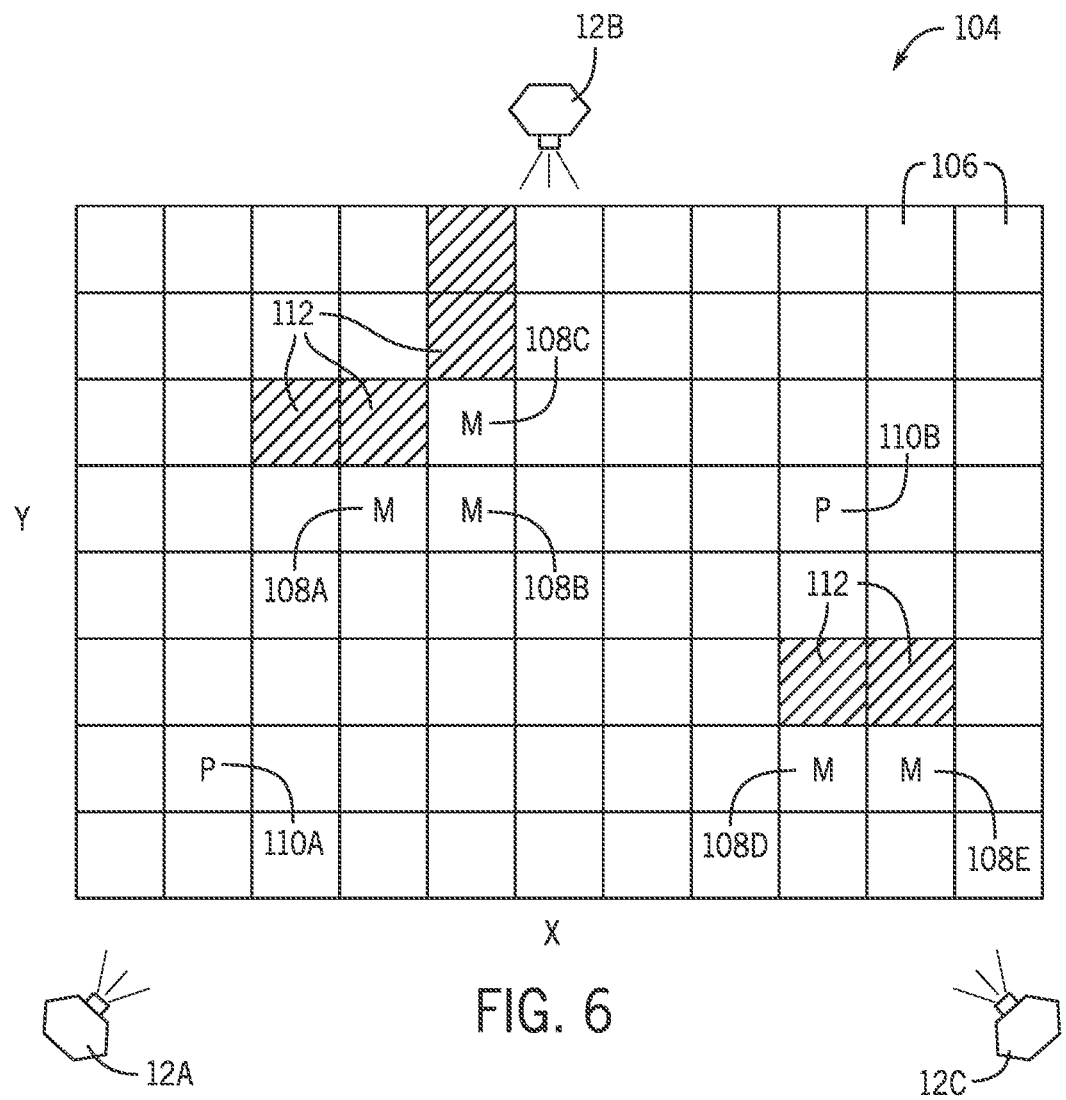
FIG. 6 is a simplified example of a rectilinear grid representing a physical environment that may be monitored by one or more anti-collision and motion monitoring devices, in accordance with embodiments the present disclosure.

FIG. 6 is a simplified example of a rectilinear grid 104 representing a physical environment 46 that may be monitored by one or more anti-collision and motion monitoring devices 12. In particular, as illustrated in FIG. 6, the physical environment 46 is being monitored by a first anti-collision and motion monitoring device 12A, a second anti-collision and motion monitoring device 12B, and a third anti-collision and motion monitoring device 12C. Although illustrated in FIG. 6 as being a two-dimensional rectilinear grid 104 for ease of explanation, it will be appreciated that the rectilinear grid 104 may indeed include a third dimension, and that the techniques described herein may be extended to the third dimension. As described herein, when the anti-collision and motion monitoring devices 12A, 12B, 12C are communicatively coupled into a mesh network with each other, the anti-collision and motion monitoring devices 12A, 12B, 12C may coordinate with each other to ensure that as much of the physical environment 46 is continually monitored as possible. In particular, the anti-collision and motion monitoring devices 12A, 12B, 12C may communicate with each other to complement the data that is detected by the respective anti-collision and motion monitoring device 12A, 12B, 12C.

For example, as described in greater detail herein, each of the anti-collision and motion monitoring devices 12A, 12B, 12C may be configured to individually monitor the physical environment 46 by itself, for example, by detecting data relating to presence and/or movement of machinery 18 and/or people 20 in the physical environment 46 and requesting complementary data from another anti-collision and motion monitoring device 12A, 12B, 12C only when such data would likely enhance the monitoring being performed by the respective anti-collision and motion monitoring device 12A, 12B, 12C. In particular, in certain embodiments, an anti-collision and motion monitoring device 12A, 12B, 12C may request complementary data from another anti-collision and motion monitoring device 12A, 12B, 12C only when there is a particular section 106 of the rectilinear grid 104 to which the respective anti-collision and motion monitoring device 12A, 12B, 12C does not have line of sight. In addition, in certain embodiments, an anti-collision and motion monitoring device 12A, 12B, 12C may request complementary data from another anti-collision and motion monitoring device 12A, 12B, 12C only when such data would likely enhance the monitoring being performed by the respective anti-collision and motion monitoring device 12A, 12B, 12C. For example, in certain embodiments, an anti-collision and motion monitoring device 12A, 12B, 12C may request complementary data from another anti-collision and motion monitoring device 12A, 12B, 12C only when the respective anti-collision and motion monitoring device 12A, 12B, 12C is currently tracking a piece of machinery 18 and/or a person 20 having a currently tracked position in and/or a current movement trajectory into a particular section 106 of the rectilinear grid 104 (e.g., in a zone of particular interest, such as a "hot zone", as described in greater detail herein), and another anti-collision and motion monitoring device 12A, 12B, 12C is determined to have data that would complement the data locally detected by the respective anti-collision and motion monitoring device 12A, 12B, 12C (e.g., which may be referred to as "primary" data). In other words, in certain embodiments, an anti-collision and motion monitoring device 12A, 12B, 12C may individually monitor a physical environment 46 by itself, and only request complementary data from another anti-collision and motion monitoring device 12A, 12B, 12C at times when the respective anti-collision and motion monitoring device 12A, 12B, 12C does not have line of sight to a particular section 106 of the rectilinear grid 104 and when the respective anti-collision and motion monitoring device 12A, 12B, 12C would benefit from complementary data from another anti-collision and motion monitoring device 12A, 12B, 12C. As such, the data transferred between the anti-collision and motion monitoring devices 12A, 12B, 12C via the mesh network may be minimized insofar as data is only transferred between anti-collision and motion monitoring devices 12A, 12B, 12C when the data is required by a particular anti-collision and motion monitoring device 12A, 12B, 12C.

In certain embodiments, each of the anti-collision and motion monitoring devices 12A, 12B, 12C may store (e.g., in the at least one memory medium 32 and/or the at least one storage medium 34 of the respective anti-collision and motion monitoring device 12) data relating to positioning and orientation of the other anti-collision and motion monitoring devices 12A, 12B, 12C for the purpose of determining when another anti-collision and motion monitoring device 12A, 12B, 12C may be positioned and oriented in a manner that would enable one of the other anti-collision and motion monitoring device 12A, 12B, 12C to provide complementary data to the respective anti-collision and motion monitoring device 12A, 12B, 12C, for example, when the respective anti-collision and motion monitoring device 12A, 12B, 12C does not have line of sight to a particular section 106 of the rectilinear grid 104 and when the respective anti-collision and motion monitoring device 12A, 12B, 12C would benefit from complementary data from the other anti-collision and motion monitoring device 12A, 12B, 12C. In certain embodiments, the data relating to positioning and orientation of the other anti-collision and motion monitoring devices 12A, 12B, 12C may be communicated between the anti-collision and motion monitoring devices 12A, 12B, 12C at the time that the anti-collision and motion monitoring devices 12A, 12B, 12C are communicatively coupled to each other. In addition, in certain embodiments, the data relating to positioning and orientation of the other anti-collision and motion monitoring devices 12A, 12B, 12C may be communicated between the anti-collision and motion monitoring devices 12A, 12B, 12C through periodic updates that occur at particular time intervals (e.g., every hour, every 30 minutes, every 15 minutes, every 10 minutes, every 5 minutes, every minute, or even more frequently).

To illustrate how the anti-collision and motion monitoring devices 12A, 12B, 12C may cooperate with each other to monitor a physical environment 46, FIG. 6 depicts an example physical environment 46 that includes five grid sections 108A, 108B, 108C, 108D, 108E that currently include at least a portion of machinery 18 (M) and two grid sections 110A, 110B that currently include at least a portion of a person 20 (P). In the example layout illustrated in FIG. 6, an anti-collision and motion monitoring device 12C may not have line of sight of a grid section 110B that includes at least a portion of a person 20 (P). As such, at this point in time, the anti-collision and motion monitoring device 12C may request complementary data from either of the other anti-collision and motion monitoring devices 12A, 12B. However, again, in certain embodiments, to minimize data transfer via the mesh network established between the anti-collision and motion monitoring devices 12A, 12B, 12C, the anti-collision and motion monitoring device 12C may only request complementary data from one, but not both, of the other anti-collision and motion monitoring devices 12A, 12B.

Many parameters may be considered by the anti-collision and motion monitoring device 12C when determining which of the other anti-collision and motion monitoring devices 12A, 12B would be the best option from which to request data. One parameter that may be used by the anti-collision and motion monitoring device 12C may be proximity between the anti-collision and motion monitoring device 12C and the other anti-collision and motion monitoring devices 12A, 12B. For example, if the anti-collision and motion monitoring device 12C is closer to the anti-collision and motion monitoring device 12A than to the anti-collision and motion monitoring device 12B, then the anti-collision and motion monitoring device 12C may request complementary data from the anti-collision and motion monitoring device 12A. Another parameter that may be used by the anti-collision and motion monitoring device 12C may be a confidence level that each of the other anti-collision and motion monitoring devices 12A, 12B is capable of providing the complementary data for the grid section 110B of interest to the anti-collision and motion monitoring device 12C such that the data will prove useful to the anti-collision and motion monitoring device 12C. For example, if the anti-collision and motion monitoring device 12B has a clear line of sight of the grid section 110B of interest to the anti-collision and motion monitoring device 12C than the anti-collision and motion monitoring device 12A, then the confidence level of the anti-collision and motion monitoring device 12B may be higher than that of the anti-collision and motion monitoring device 12A. Yet another parameter that may be used by the anti-collision and motion monitoring device 12C may be signal strength from the other anti-collision and motion monitoring devices 12A, 12B, which may be detected by the anti-collision and motion monitoring device 12C. For example, if the anti-collision and motion monitoring device 12C detects a greater signal strength from the anti-collision and motion monitoring device 12A than from the anti-collision and motion monitoring device 12B, then the anti-collision and motion monitoring device 12C may request complementary data from the anti-collision and motion monitoring device 12A. It will be appreciated that any combination of these parameters, as well as other parameters relating to the probability that one of the other anti-collision and motion monitoring devices 12A, 12B may be capable of providing sufficient complementary data, may be used by the anti-collision and motion monitoring device 12C. In certain embodiments, data relating to these parameters may be requested from the other anti-collision and motion monitoring devices 12A, 12B by the anti-collision and motion monitoring device 12C as a ping request to receive the data relating to these parameters before initiating a data stream relating to the grid section 110B of interest from a selected other anti-collision and motion monitoring device 12A, 12B.

As described in greater detail herein, the software algorithms employed by the processing circuitry 26 of the anti-collision and motion monitoring devices 12 and the control circuitry 28 of the central coordinator 14 consist of a multi-staged approach to solving the issue of finding, tracking, and identifying objects (e.g., machinery 18 and/or people 20) within a defined area (e.g., a defined physical environment 46). As described in greater detail herein, this multi-staged approach consists of an embedded backend device layer (e.g., in the anti-collision and motion monitoring devices 12, in certain embodiments), a high-level middleware layer (e.g., in the central coordinator 14, in certain embodiments), and a configurable UI frontend (e.g., in the central coordinator 14, in certain embodiments). As also described in greater detail herein, the backend device layer combines full data capture and masking of static objects, followed by filtering of, for example, a boxed area of the physical environment 46 and compensation for angles of deflection, for example. In certain embodiments, the backend device layer clusters the remaining data regions, and computes a linear interpolation of a flat x/y grid model (e.g., similar to the rectilinear grid 104 illustrated in FIG. 6) within a fixed area of the physical environment 46. In general, the backend device layer identifies the location and type of objects (e.g., machinery 18 and/or people 20) using machine learning, and moves the data to the middleware layer for further analysis.

In certain embodiments, the software algorithms employed by the processing circuitry 26 of the anti-collision and motion monitoring devices 12 and the control circuitry 28 of the central coordinator 14 acquire a three-dimensional space, and create a two-dimensional flat grid (e.g., similar to the rectilinear grid 104 illustrated in FIG. 6) within the layered three-dimensional region. In certain embodiments, the grid defining the physical environment 46 may be allocated and distributed based on data read in from a configuration file. In certain embodiments, the anti-collision and motion monitoring devices 12 translate data from a point cloud space to grid coordinates, as described in greater detail herein. In certain embodiments, a plurality of grids relating to the physical environment 46 may be created, which may slightly overlap such that if one anti-collision and motion monitoring device 12 fails to capture certain point cloud data, another anti-collision and motion monitoring device 12 may capture the point cloud data, and send it to the middleware layer for processing.

In certain embodiments, to take into account the zero indexing of storing the data, the embedded device layer may apply an offset to bring all negative values in the x-axis to zero, for example, so that the entire grid is shifted, which may be applied by the middleware layer. In certain embodiments, the middleware layer may or may not apply this offset, but rather may assume that it is starting from the specified location, but the offset is there due to the location of the anti-collision and motion monitoring device 12 in the physical world not located at (0,0). In certain embodiments, the calculation for the y-axis may be different than the x-axis due to the fact that the y-offset starting point may not necessarily be at the location of the anti-collision and motion monitoring device 12, but rather may be at an offset a few meters away from the anti-collision and motion monitoring device 12. Depending on the location of the anti-collision and motion monitoring device 12, this may vary in distance. This offset may be noted for the middleware and UI layers.

As described in greater detail herein, in certain embodiments, calibration may be performed for each anti-collision and motion monitoring device 12 to create a mask of the physical environment 46 such that the anti-collision and motion monitoring device 12 may filter out all static objects (e.g., machinery 18) in the physical environment 46. In certain embodiments, data relating to such static objects may be stored in memory for analysis. As such, data relating to such static objects need not be communicated between anti-collision and motion monitoring devices 12 and/or the central coordinator 14 during periods of operation.

In certain embodiments, data packets from the anti-collision and motion monitoring devices 12 may include a unique identifier (ID) assigned to the respective anti-collision and motion monitoring device 12 (e.g., a media access control (MAC) address assigned to the respective anti-collision and motion monitoring device 12), a type of object (e.g., type of machinery 18 or person 20) to which the data packet relates, an X location for the object to which the data packet relates, a Y location for the object to which the data packet relates, additional coordinate data for the object to which the data packet relates, and so forth. For example, in certain embodiments, the format of the data packets may be:

[=Start Character
MAC=MAC Address (12-bytes)
;=Data Delimiter (1-byte)
Type=Type of Object (1-byte)
,=Byte Delimiter (1-byte)
X Location=X-Coordinate (1-byte)
,=Byte Delimiter (1-byte)
Y Location=Y-Coordinate (1-byte)
. . . =Additional Coordinates (6-bytes including delimiter)
]=End Character
NULL=NULL Character for End of Bytestream In certain embodiments, the data elements within the data packets may be structured such that the data may be read to determine from where the data is being transmitted and the grid locations of relevant data. In certain embodiments, each data portion of a data packet may include a total of 6-bytes including a data delimiter (e.g., semicolon) and byte delimiters (e.g., commas). In certain embodiments, additional data may be appended to the data packet after each data delimiter (e.g., semicolon).

In certain embodiments, the grid (e.g., similar to the rectilinear grid 104 illustrated in FIG. 6) of the physical environment 46 may be assumed to be completely empty upon initialization and, for example, set to all '0' values. As described in greater detail herein, to minimize data transmission via the mesh network established by the anti-collision and motion monitoring devices 12, only relevant data may be transmitted, as opposed to transmitting data relating to the entire grid. For example, the anti-collision and motion monitoring devices 12 and the middleware listeners (e.g., of the central coordinator 14) may only use data that relates to objects (e.g., machinery 18 and/or people 20) of interest so as to avoid network latency.

MAC Address: In certain embodiments, the anti-collision and motion monitoring devices 12 may transmit the last 4 digits of its unique MAC address within every data packet. In certain embodiments, the middleware listener may maintain this MAC address for all consecutive responses to know which anti-collision and motion monitoring devices 12 are sending received data. In certain embodiments, the MAC addresses of the anti-collision and motion monitoring devices 12 may be maintained within memory until the next reboot, restart, or update.

Object Type: In certain embodiments, the object type included in a data packet may be represented in a 1-byte hex value table (e.g., relating data values with corresponding object types) with many possible combinations. In certain embodiments, as described in greater detail herein, the value table may be continually refined as a machine learning model is trained and implemented. In certain embodiments, the trained machine learning algorithm may be capable of verifying objects at particular grid locations, and providing information identifying the object type of the verified objects.

Grid Coordinates: In certain embodiments, the grid coordinates included in a data packet may be represented by two 2-byte values (e.g., the first value being the X coordinate and the next value being the Y coordinate), which may represent a section of the grid across a dedicated area monitored by the specific anti-collision and motion monitoring device 12. In particular, the two coordinates represent a specific area in the grid (e.g., similar to the grid sections 106 of the rectilinear grid 104 illustrated in FIG. 6) where the object type is present. In certain embodiments, to minimize data transfer, the location data may only be sent if a relevant object (e.g., machinery 18 and/or person 20) is in the defined space and the grid has the object type from the value table described herein. The middleware listener may receive the type and location information, readily determine to what and where the data relates, and provide intelligence needed for a frontend to make decisions.

Figure 7:
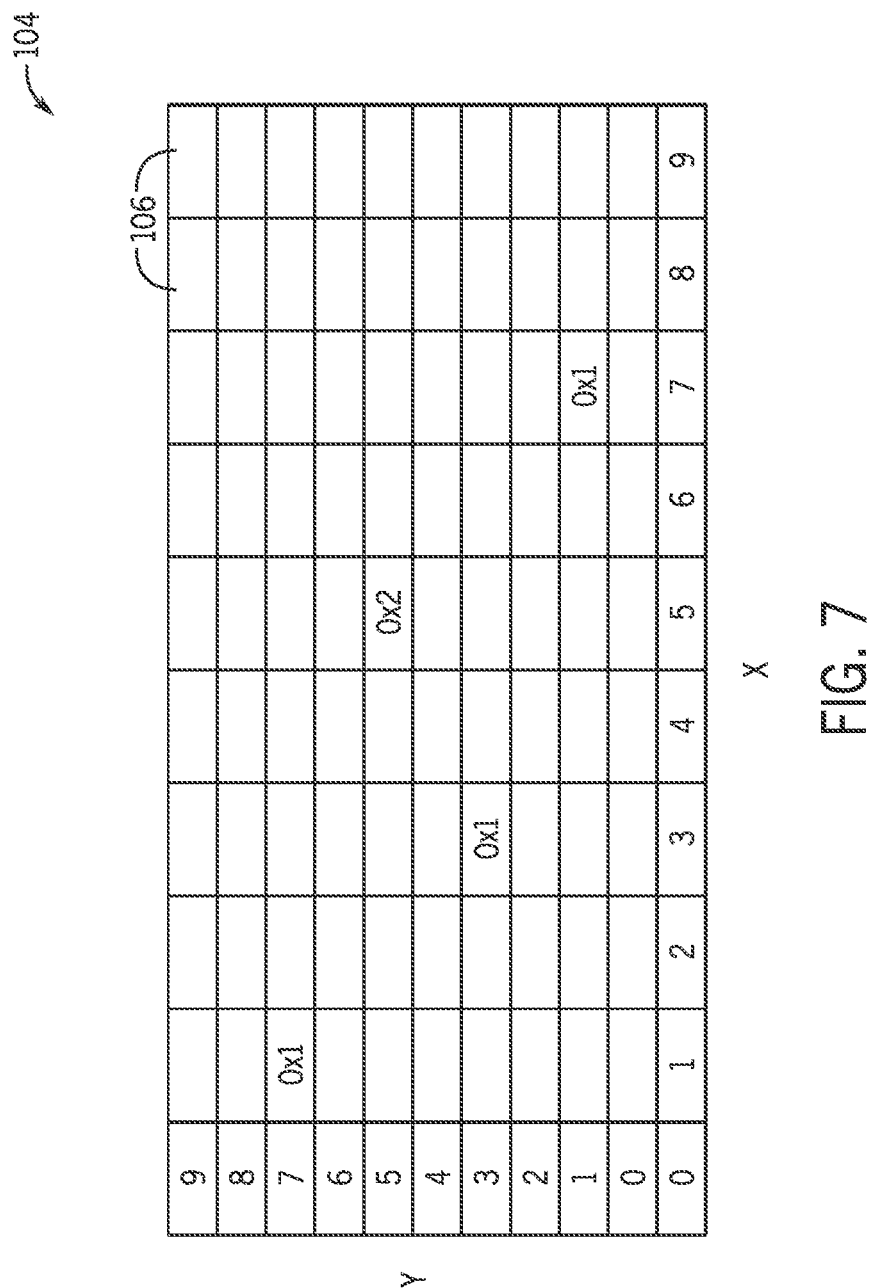
FIG. 7 illustrates another view of the rectilinear grid of FIG. 6, in accordance with embodiments the present disclosure.
Figure 8:
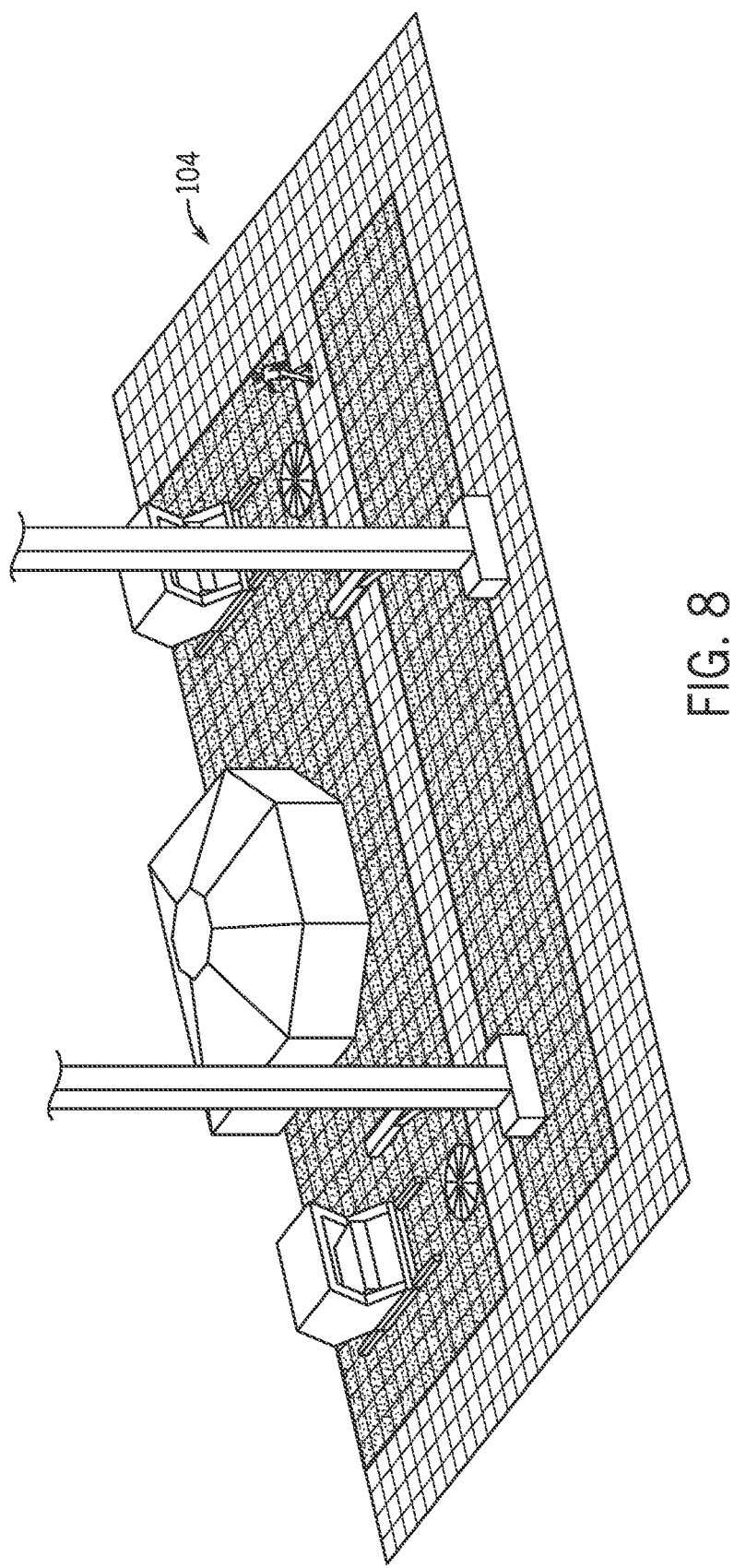
FIGS. 8-11 illustrate a plurality of views that may be displayed via a user interface, in accordance with embodiments the present disclosure.
Figure 9:
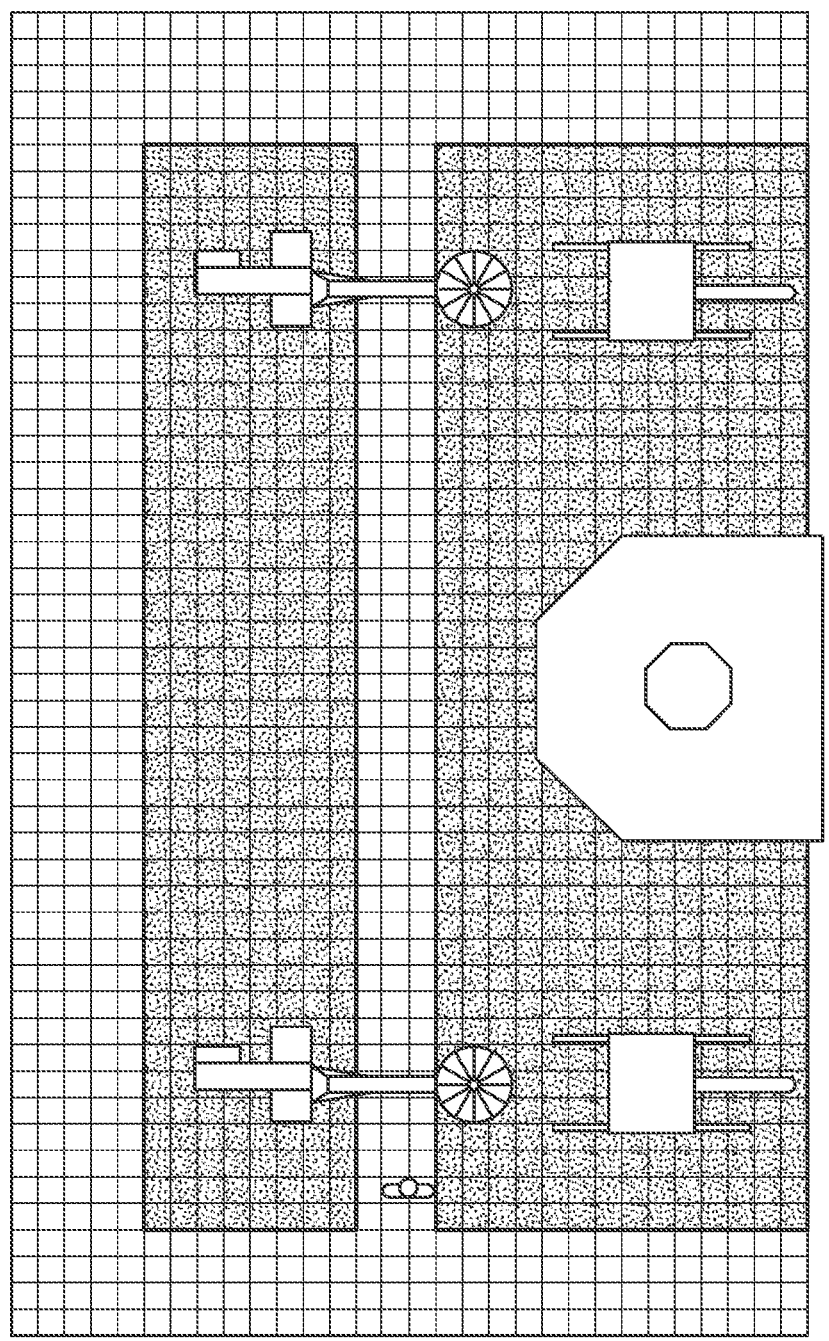
Figure 10:
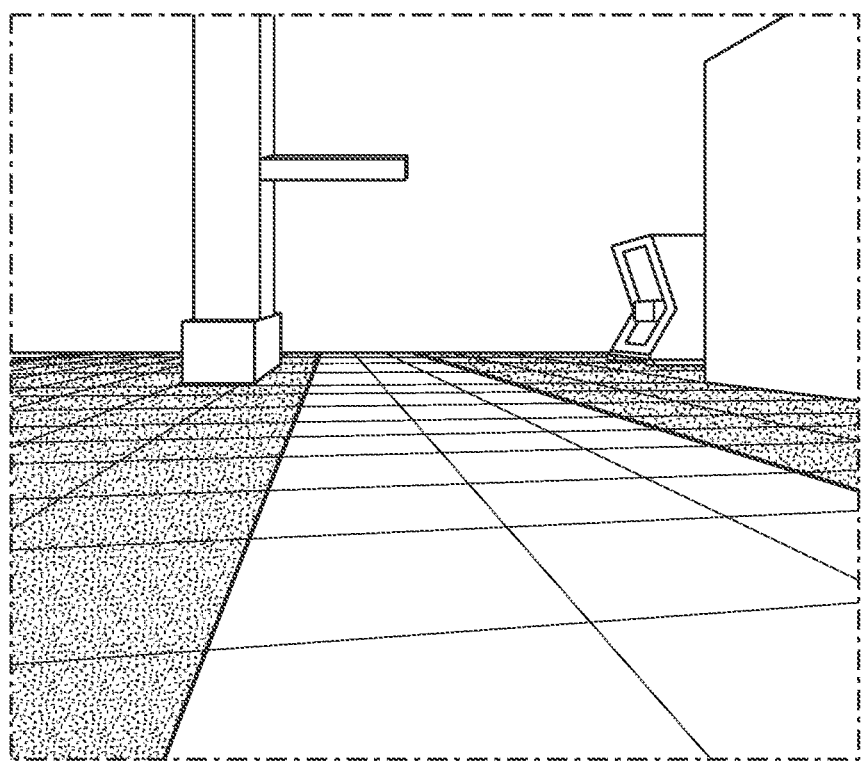

To further illustrate how the data packets may be formed, FIG. 7 illustrates another view of the rectilinear grid 104 of FIG. 6. In particular, the rectilinear grid 104 illustrated in FIG. 7 includes three human objects (e.g., having an object type value of 0x1) and one piece of machinery (e.g., having an object type value of 0x2). The rectilinear grid 104 illustrated in FIG. 7 would look like the following in packet form:

[00044bc48490;1,7,1;1,3,3,<data element>;2,5,5;1,1,7]

The start characters are designated as brackets, the individual packet delimiters are designated as semicolons, and the values are separated with commas to separate the numbers. The locations are zero indexed. The data may be read in the following manner, with <data element> representing data that occurs at the grid section 106 at Row 3, Column 3:

[=Start Character
00044bc48490=MAC Address
;=Data Set Delimiter
Data Set 1:
1=Object Type (1)—Human
,=Data Separator
7=Row 7
,=Data Separator
1=Column 1
;=Data Set Delimiter
Data Set 2:
1=Object Type (1)—Human
,=Data Separator
3=Row 3
,=Data Separator
3=Column 3
,=Data Separator
9
8
7
0x1
6
5
0x2
4
3
0x1
2
1
0x1
0
0
1
2
3
4
5
6
7
8
9
;=Data Set Delimiter
Data Set 3:
2=Object Type (2)—Machinery Type #1
,=Data Separator
5=Row 5
,=Data Separator
5=Column 5
;=Data Set Delimiter
Data Set 4:
1=Object Type (1)—Human
,=Data Separator
1=Row 1
,=Data Separator
7=Column 7
]=End Character In certain embodiments, the interpolated data may be transmitted to the middleware listener, which expects a data packet containing all the relevant locations of found objects, the middleware listener parses the data packet and applies the relevant status based on the coordinate locations of the found objects, and the middleware listener performs intelligence on the data, and lets the UI layer know what it needs to display the physical environment 46. In certain embodiments, each anti-collision and motion monitoring device 12 may wirelessly send its coordinate packet of the designated data grid. In certain embodiments, the middleware listener may use each of the data packets from a plurality of anti-collision and motion monitoring devices 12 to overlap and triangulate the location of an object based on its individual grid location. Using intelligence and the information given, the middleware listener will be able to combine all the overlapping grid spaces into one large area of interest, and place the objects in their correct location.

Figure 11:
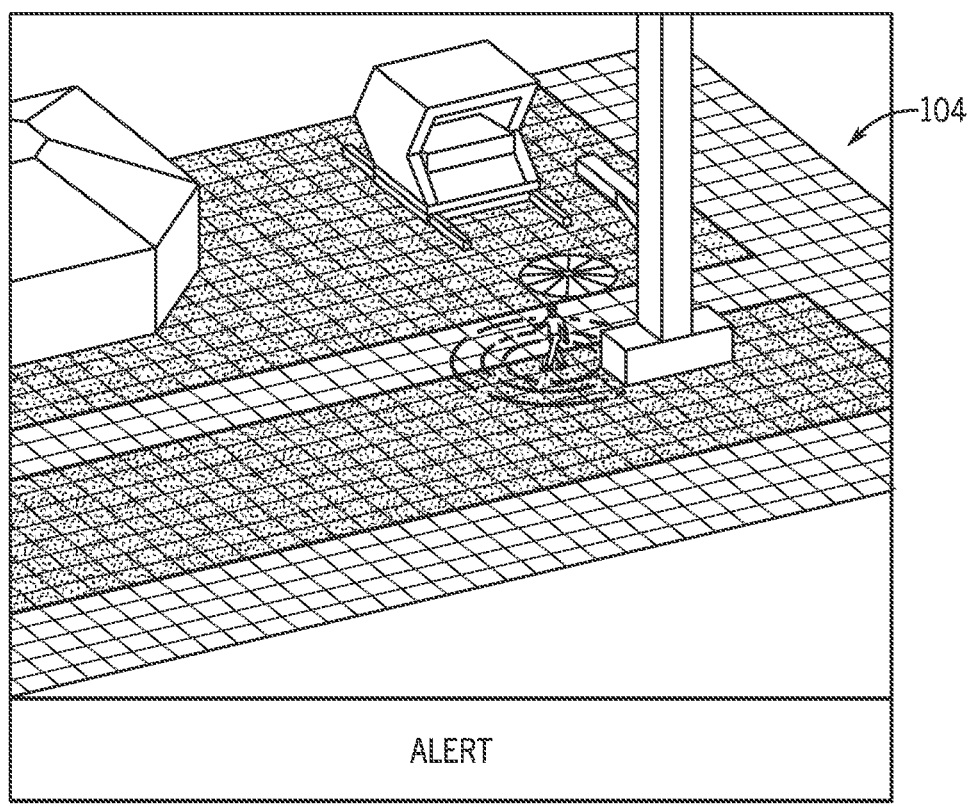

In certain embodiments, the UI layer (e.g., the visualization/UI engine 96 of the central coordinator 14) may receive a wrapped data packet from the middleware listener to display and configure a user interface 98 to its relevant settings identifying the exact grid locations and relevant areas where potential problems exist. As described in greater detail herein, the user interface 98 allows a user to configure red zones in real-time, allowing for dynamic operations and zone captures. This enables users to be able to switch areas of interest quickly and efficiently. FIGS. 8-11 illustrate a plurality of views that may be displayed via the user interface 98, depicting how the grid and its associated objects may be displayed. In particular, FIG. 11 illustrates a view having an alert displayed when a potential problem exists.

In addition, in certain embodiments, the visualization/UI engine 96 may also be configured to provide, among other things, a user interface 98 that displays a grid heat map of the physical environment 46 being monitored by the anti-collision and motion control system 10. For example, FIG. 6 also illustrates an example of a "heat map" for a physical environment 46 being monitored by the anti-collision and motion control system 10. For example, as illustrated in FIG. 6, in certain embodiments, certain grid sections 106 may depict regions 112 that have particularly high levels of movement or other activity, such as heat and noise, in them (i.e., "hot zones"). In certain embodiments, regions 112 may be identified by color to illustrate the degree of movement and/or other activity that these regions 112 tend to have. For example, regions 112 with relatively high levels movement and/or other activity may be colored red, whereas regions 112 with relatively low levels movement and/or other activity may be colored green (or have no color at all), and the regions 112 with levels of movement and/or other activity in between may vary across an appropriate spectrum between red and green (or no color at all). The heat map illustrated in FIG. 6 may, for example, enable users to redesign processes performed in the physical environment 46.

In certain embodiments, data science algorithms may be implemented using, for example, neural networks to create a machine learning model for the object classification performed by the object classification modules 66 of the anti-collision and motion monitoring devices 12. In certain embodiments, the algorithms may be continuously re-trained and iterated to yield the most accurate results in identifying humans vs. machinery, certain types of machinery from each other, and so forth. In certain embodiments, custom neural networks may be created to classify base images from, for example, a public data set. In other embodiments, pre-trained models may be pre-trained based on images from environments similar to the physical environment 46 being monitored (e.g., images for other drill rings when a drill rig is being monitored). In yet other embodiments, knowledge learned from existing models may be customized to the particular criteria of the physical environment 46 being monitored. In such embodiments, cropping and fixation may be used to locate areas of interest in images, cropping the areas of interest to smaller subsections, and sizing them for the model.

As described in greater detail herein, the anti-collision and motion control system 10 may be configured to alert people 20 located in the physical environment being monitored by the one or more anti-collision and motion monitoring devices 12, for example, when the people 20 move into areas of the physical environment that the central coordinator 14 believes that the people 20 should not be in. In particular, in certain embodiments, the anti-collision and motion control system 10 may track the number of people 20 in particular zones (e.g., in hot zones, as depicted by the grid sections 112 in FIG. 6), how long the people 20 have been in the particular zones, operational activity of machinery 18 in the particular zones, and so forth, may access current operating parameters of the machinery 18, and may use all of this data to determine when alerts should be generated (e.g., without human intervention, in certain embodiments). For example, in certain embodiments, the anti-collision and motion control system 10 may generate an alert when a certain threshold of people 20 in a particular hot zone is exceeded. The alerts that may be generated may include visual alarms (e.g., visual messages, color changes, changes in text size, and so forth) that are displayed via a user interface 98, auditory alarms (e.g., different audio tones for different people 20, and so forth) that are created via a user interface 98, and any other suitable alarms.

As illustrated in FIGS. 2 and 5, in certain embodiments, the anti-collision and motion control system 10 may also generate alarms via certain wearable devices 114 associated with certain people 20 (e.g., without human intervention, in certain embodiments). For example, in certain embodiments, a person 20 may be assigned a helmet (e.g., hardhat) 114A, a badge 114B, a glove or pair of gloves 114C, a belt 114D, a boot or pair of boots 114E, and/or any other wearable devices 114 (e.g., embedded in or attached to other types of clothing and gear, such as hats, glasses, coats, jackets, shirts, vests, pants, shoes, tools, and so forth), which may have processing circuitry 116 embedded therein, or otherwise attached thereto, that is configured to generate certain alarms based on alarm signals received, for example, from the central coordinator 14 of the anti-collision and motion control system 10 via wireless communication circuitry 118 of the wearable devices 114. For example, the processing circuitry 116 of the wearable devices 114 may include at least one processor 120, at least one memory medium 122, at least one actuator 124, or any of a variety of other components that enable the processing circuitry 116 to carry out the techniques described herein.

In particular, the at least one processor 120 of the wearable devices 114 may be configured to use alarm signals received, for example, from the central coordinator 14 of the anti-collision and motion control system 10 via the communication circuitry 118 of the wearable devices 114, and to execute instructions stored in the at least one memory medium 122 of the wearable devices 114 to cause the at least one actuator 124 of the wearable devices 114 to generate an alarm, such as haptic feedback, audible sounds, or some combination thereof, in accordance with the received alarm signals. In addition, in certain embodiments, the wearable devices 114 may be augmented reality googles or glasses configured to display certain alarms via at least one augmented reality display 126 of the wearable devices 114.

In addition, in certain embodiments, the wearable devices 114 may also include markers 128, such as reflective materials and/or markers having specific recognizable shapes or patterns, that may be detected by the anti-collision and motion monitoring devices 12 described herein to aid in the tracking of movement and/or orientation of the wearable devices 114 and, by extension, the people 20 who are assigned to the wearable devices 114. Indeed, in certain embodiments, some pieces of machinery 18 may also have such markers 128 attached thereto, which may similarly be detected by the anti-collision and motion monitoring devices 12 described herein to aid in the tracking of movement and/or orientation of the pieces of machinery 18. In addition, in certain embodiments, the wearable devices 114 may also include a battery 130 to provide the respective wearable device 114 with power.

The at least one processor 120 of the wearable devices 114 may be any suitable type of computer processor or microprocessor capable of executing computer-executable code. In certain embodiments, the at least one processor 120 of the wearable devices 114 may also include multiple processors that may perform the operations described herein. The at least one memory medium 122 of the wearable devices 114 may be any suitable articles of manufacture that can serve as media to store processor-executable code, data, or the like. These articles of manufacture may represent computer-readable media (e.g., any suitable form of memory or storage) that may store the processor-executable code used by the at least one processor 120 to perform the presently disclosed techniques. As described in greater detail herein, the at least one memory medium 122 of the wearable devices 114 may also be used to store data, various other software applications, and the like. The at least one memory medium 122 of the wearable devices 114 may represent non-transitory computer-readable media (e.g., any suitable form of memory or storage) that may store the processor-executable code used by the at least one processor 120 to perform various techniques described herein. It should be noted that non-transitory merely indicates that the media is tangible and not a signal. In certain embodiments, the at least one actuator 124 of the wearable devices 114 may include any actuators that are configured to generate alarms, such as haptic feedback devices configured to vibrate or otherwise move, speakers configured to generate audible sounds, or some combination thereof.

The types of alarms that may be generated by the actuators 124 of the wearable devices 114 may vary based upon the particular operations of the wearable devices 114. For example, in certain embodiments, as a person 20 moves closer to a piece of machinery 18 that is considered to be in a hot zone, haptic feedback generated by an actuator 124 of a wearable device 114 being worn by the person 20 may intensify and/or audible sounds generated by the actuator 124 of the wearable device 114 being worn by the person 20 may grow louder. In other embodiments, the type of haptic feedback and/or audible sounds generated by the actuators 124 of the wearable devices 114 may vary based on a type of alarm. For example, a first type of alarm (e.g., a notification of proximity of a person 20 to a particular piece of machinery 18) may generate a particular pattern of haptic vibrations and/or audible sounds, whereas a second type of alarm (e.g., a notification to evacuate the particular physical environment 46) may generate a different pattern of haptic vibrations and/or audible sounds. In other embodiments, the type of haptic feedback and/or audible sounds generated by the actuators 124 of the wearable devices 114 may vary based on a type of machinery 18 to which a person 20 is getting closer and/or to the relative level of movement and/or other activity that tends to occur in a particular region (e.g., whether categorized as a hot zone or not) of the physical environment 46 to which a person 20 is getting closer.

In certain embodiments, the alarms may not only be generated by the anti-collision and motion control system 10 via wearable devices 114 that are being worn by the person 20 to which the alarm relates, but also to other people 20, such as supervisors and/or operators of the machinery 18. For example, if a first person 20 is getting to close to a particular piece of machinery 18 and/or a particular region of the physical environment 46, the first person 20 as well as a second person 20 (e.g., a supervisor and/or an operator of the machinery 18) may both be alerted by the anti-collision and motion control system 10 via respective wearable devices 114 (e.g., without human intervention, in certain embodiments).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. An anti-collision and motion control system, comprising:
    a plurality of anti-collision and motion monitoring systems, each anti-collision and motion monitoring system being positioned at a different stationary position in an environment and comprising:
        one or more light detection and ranging (LiDAR) systems configured to detect locations of one or more objects in the environment;
        one or more camera systems configured to capture images of the one or more objects in the environment that are detected by the one or more LiDAR systems; and
        processing circuitry configured to receive inputs from the one or more LiDAR systems and the one or more camera systems relating to the one or more objects in the environment, and to process the inputs received from the one or more LiDAR systems and the one or more camera systems to determine outputs relating to the one or more objects in the environment; and
    a central coordinator configured to receive the outputs from the processing circuitry of the plurality of anti-collision and motion monitoring systems, to compile the outputs into visualization data relative to a plurality of grid sections of a rectilinear grid of the environment, and to communicate a visualization of the rectilinear grid of the environment to a user interface, wherein the visualization comprises the visualization data relative to the plurality of grid sections of the rectilinear grid of the environment,
        wherein the visualization data defines positioning and movement of the one or more objects relative to the plurality of grid sections of the rectilinear grid of the environment, and
        wherein the visualization of the rectilinear grid of the environment includes a heat map providing visual indication of a relative level of movement within each of the grid sections.

2. The anti-collision and motion control system of claim 1, wherein the central coordinator is configured to receive the outputs from the processing circuitry of the plurality of anti-collision and motion monitoring systems as data formatted in a data format corresponding to the plurality of grid sections of the rectilinear grid of the environment.

3. The anti-collision and motion control system of claim 1, wherein the central coordinator is configured to determine one or more alarms relating to activity of the one or more objects in the environment based at least in part on the outputs received from the processing circuitry of the plurality of anti-collision and motion monitoring systems, and to communicate the one or more alarms to the user interface via the visualization of the rectilinear grid of the environment.

4. The anti-collision and motion control system of claim 1, wherein the central coordinator is configured to determine one or more alarms relating to activity of the one or more objects in the environment based at least in part on the outputs received from the processing circuitry of the plurality of anti-collision and motion monitoring systems, and to communicate the one or more alarms to one or more wearable devices located in the environment.

5. The anti-collision and motion control system of claim 1, wherein the central coordinator is configured to control one or more operating parameters of at least one of the one or more objects in the environment based at least in part on the outputs received from the processing circuitry of the plurality of anti-collision and motion monitoring systems.

6. An anti-collision and motion monitoring system, comprising:
    a housing configured for stationary positioning in an environment:
    one or more light detection and ranging (LiDAR) systems configured to detect locations of one or more objects in an environment in the housing;
    one or more camera systems configured to capture images of the one or more objects in the environment that are detected by the one or more LiDAR systems in the housing;
    processing circuitry in the housing configured to receive inputs from the one or more LiDAR systems and the one or more camera systems relating to the one or more objects in the environment, to process the inputs received from the one or more LiDAR systems and the one or more camera systems to determine primary data relating to the one or more objects in the environment relative to a first plurality of grid sections of a rectilinear grid of the environment, and to request complementary data relating to the one or more objects in the environment relative to a second plurality of grid sections of the rectilinear grid from a second anti-collision and motion monitoring system only when the processing circuitry cannot determine primary data relating to the one or more objects in the environment relative to the second plurality of grid sections of the rectilinear grid; and a central coordinator configured to compile the primary data and the requested complementary data from the processing circuitry into a visualization of the rectilinear grid, the visualization comprising a heat map that provides visual indication of a relative level of movement within each of the grid sections.

7. The anti-collision and motion monitoring system of claim 6, wherein the processing circuitry is configured to format outputs relating to the primary data and the complementary data into a data format corresponding to the first and second pluralities of grid sections of the rectilinear grid of the environment, and to communicate the outputs to the central coordinator.

8. The anti-collision and motion monitoring system of claim 6, wherein the processing circuitry is configured to request the complementary data relating to the one or more objects in the environment relative to the second plurality of grid sections of the rectilinear grid from the second anti-collision and motion monitoring system only when the one or more LiDAR systems or the one or more camera systems do not have line of sight of at least one of the one or more objects in the environment.

9. The anti-collision and motion monitoring system of claim 8, wherein the processing circuitry is configured to request the complementary data relating to the one or more objects in the environment relative to the second plurality of grid sections of the rectilinear grid from the second anti-collision and motion monitoring system only when the at least one of the one or more objects in the environment is determined to be in a zone of interest within the environment.

10. The anti-collision and motion monitoring system of claim 8, wherein the processing circuitry is configured to select the second anti-collision and motion monitoring system from a plurality of anti-collision and motion monitoring systems in the environment based at least in part on a relative proximity to the second anti-collision and motion monitoring system as compared to other anti-collision and motion monitoring systems of the plurality of anti-collision and motion monitoring systems.

11. The anti-collision and motion monitoring system of claim 8, wherein the processing circuitry is configured to select the second anti-collision and motion monitoring system from a plurality of anti-collision and motion monitoring systems in the environment based at least in part on a confidence level that the second anti-collision and motion monitoring system can provide the complementary data relating to the one or more objects in the environment.

12. The anti-collision and motion monitoring system of claim 8, wherein the processing circuitry is configured to select the second anti-collision and motion monitoring system from a plurality of anti-collision and motion monitoring systems in the environment based at least in part on a relative signal strength from the second anti-collision and motion monitoring system as compared to other anti-collision and motion monitoring systems of the plurality of anti-collision and motion monitoring systems.

13. An anti-collision and motion control system, comprising:

one or more anti-collision and motion monitoring systems, each anti-collision and motion monitoring system being configured for stationary positioning in an environment and comprising:

one or more light detection and ranging (LiDAR) systems configured to detect locations of one or more objects in the environment;

one or more camera systems configured to capture images of the one or more objects in the environment that are detected by the one or more LiDAR systems; and processing circuitry configured to receive inputs from the one or more LiDAR systems and the one or more camera systems relating to the one or more objects in the environment, and to process the inputs received from the one or more LiDAR systems and the one or more camera systems to determine outputs relating to the one or more objects in the environment; and a central coordinator configured to receive the outputs from the processing circuitry of the one or more anti-collision and motion monitoring systems, to determine one or more alarms relating to activity of the one or more objects in the environment based at least in part on the outputs received from the processing circuitry of the one or more anti-collision and motion monitoring systems, and to communicate the one or more alarms to one or more wearable devices located in the environment, wherein the central coordinator is configured to compile the outputs into visualization data, the visualization data defining a visualization of a rectilinear grid of the environment, the visualization comprising a heat map that provides visual indication of a relative level of movement within each grid section in the rectilinear grid.

14. The anti-collision and motion control system of claim 13, wherein the one or more wearable devices comprise a helmet.

15. The anti-collision and motion control system of claim 13, wherein the one or more wearable devices comprise a badge.

16. The anti-collision and motion control system of claim 13, wherein the one or more wearable devices comprise a glove.

17. The anti-collision and motion control system of claim 13, wherein the one or more wearable devices comprise a belt.

18. The anti-collision and motion control system of claim 13, wherein the one or more wearable devices comprise a boot.

19. The anti-collision and motion control system of claim 13, wherein the one or more wearable devices comprise augmented reality glasses or augmented reality goggles configured to display the one or more alarms via an augmented reality display of the augmented reality glasses or augmented reality goggles.

* * * * *